United States Patent
Baxter

(12) 
(10) Patent No.: US 6,192,416 B1
(45) Date of Patent: Feb. 20, 2001

(54) COMPUTER SYSTEM HAVING FIXED COMPUTERS AND MOBILE COMPUTERS

(75) Inventor: Geoffrey David Baxter, Victoria (AU)

(73) Assignee: AAV Australia Pty Ltd, South Melbourne (AU)

(*) Notice: Under 35 U.S.C. 154(b), the term of this patent shall be extended for 0 days.

(21) Appl. No.: 08/972,550

(22) Filed: Nov. 18, 1997

(51) Int. Cl.[7] .................................................. G06F 15/16
(52) U.S. Cl. ...................... 709/248; 709/217; 709/203; 709/219; 707/202; 707/203
(58) Field of Search ................... 700/217, 203, 700/219, 229, 225; 710/10; 709/223, 248

(56) References Cited

U.S. PATENT DOCUMENTS

| | | | |
|---|---|---|---|
| 4,500,933 | 2/1985 | Chan | 360/69 |
| 5,185,857 | * 2/1993 | Rozmanith et al. | 707/507 |
| 5,452,420 | 9/1995 | Engdahl et al. | 395/285 |
| 5,463,742 | * 10/1995 | Kobayashi | 710/101 |
| 5,524,272 | * 6/1996 | Podowski et al. | 455/3.2 |
| 5,644,782 | 7/1997 | Yeates et al. | 395/830 |
| 5,671,355 | * 9/1997 | Collins | 709/25 |
| 5,720,035 | * 2/1998 | Allegre et al. | 709/225 |
| 5,732,275 | * 3/1998 | Kullick et al. | 395/712 |
| 5,765,027 | * 6/1998 | Wang et al. | 710/40 |
| 5,768,511 | * 6/1998 | Galvin et al. | 709/203 |
| 5,809,243 | * 9/1998 | Rostoker et al. | 709/217 |
| 5,835,911 | * 11/1998 | Nakagwa et al. | 707/203 |
| 5,870,759 | * 2/1999 | Bauer et al. | 707/201 |
| 5,881,142 | * 3/1999 | Frank et al. | 379/167 |
| 5,887,165 | * 3/1999 | Martel et al. | 713/100 |
| 5,918,016 | * 6/1999 | Brewer et al. | 709/220 |
| 5,928,362 | * 7/1999 | Cardillo et al. | 713/200 |

FOREIGN PATENT DOCUMENTS

| | | |
|---|---|---|
| 0 396 834 A1 | 11/1990 | (EP) . |
| 0 583 077 A1 | 2/1994 | (EP) . |
| WO 93/25948 | 12/1993 | (WO) . |
| WO 96/20445 | 7/1996 | (WO) . |
| WO 97/15885 | 5/1997 | (WO) . |

OTHER PUBLICATIONS

International Search Report, Sept. 22, 1998.

* cited by examiner

Primary Examiner—Dung C. Dinh
Assistant Examiner—Abdullahi Elmi Salad
(74) Attorney, Agent, or Firm—Fish & Richardson P.C.

(57) ABSTRACT

A method and system for propagating data such as entertainment data in an airline system is disclosed. The entertainment data may comprise video, audio and games data. A computer server device is provided at an airline terminal, and a mobile computer is provided in an aircraft with a hard disk array for storage of the digital data. The data can be propagated in the system to aircraft and to further airline terminals by an automatic software function which occurs when an aircraft mobile computer electrically connects with the server computer at the terminal. Such connection is made between the aircraft and an aerobridge at the airline terminal. The software provides checking to see if the mobile computer is an authorized computer, and also to determine whether the data in the mobile computer is more recent than the data in the computer server or vice versa and then a data exchange occurs to replace the old data with new data. As further aircraft visit the airline terminal their data is updated and the data is therefor propagated in the system. Devices are also provided on each side of the connection between the aircraft and the airline terminal for initiating security checking and for providing data pass through capability. Each mobile computer has a personality module which configures the computer to the environment in which it is placed. Thus, identical computers can be used in an airline system which may have different types of aircraft. The personality module configures the computer to the particular aircraft.

40 Claims, 22 Drawing Sheets

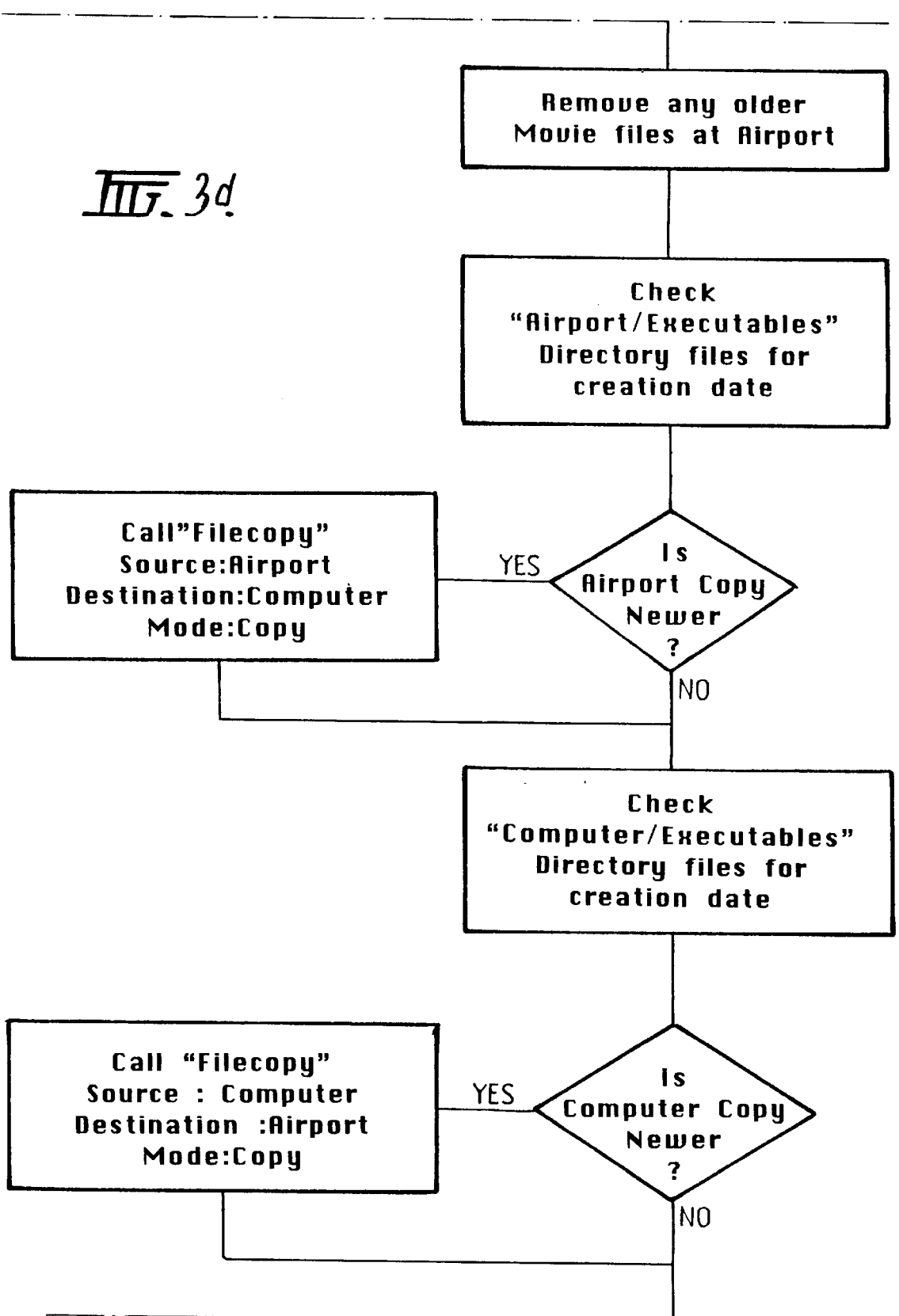

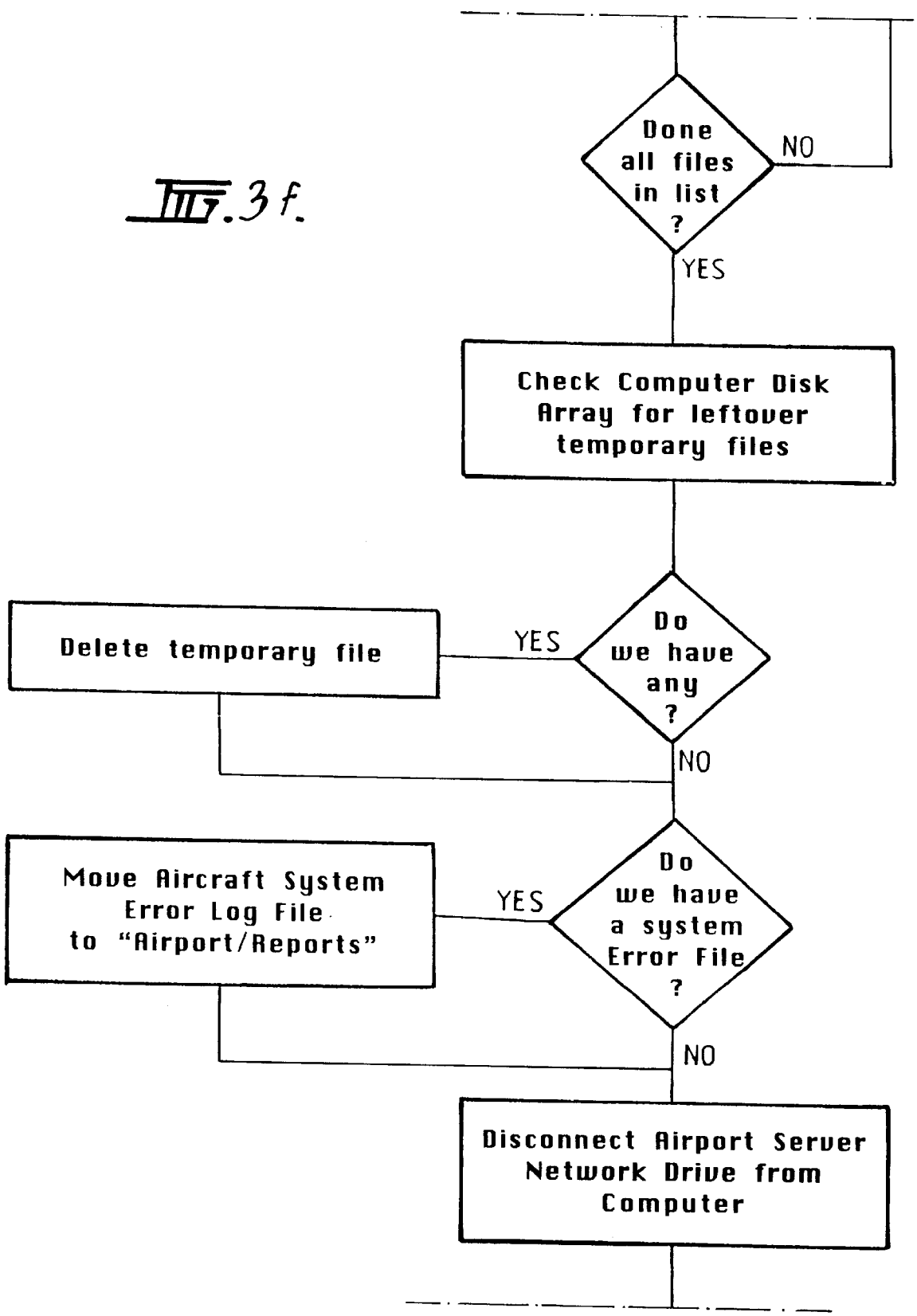

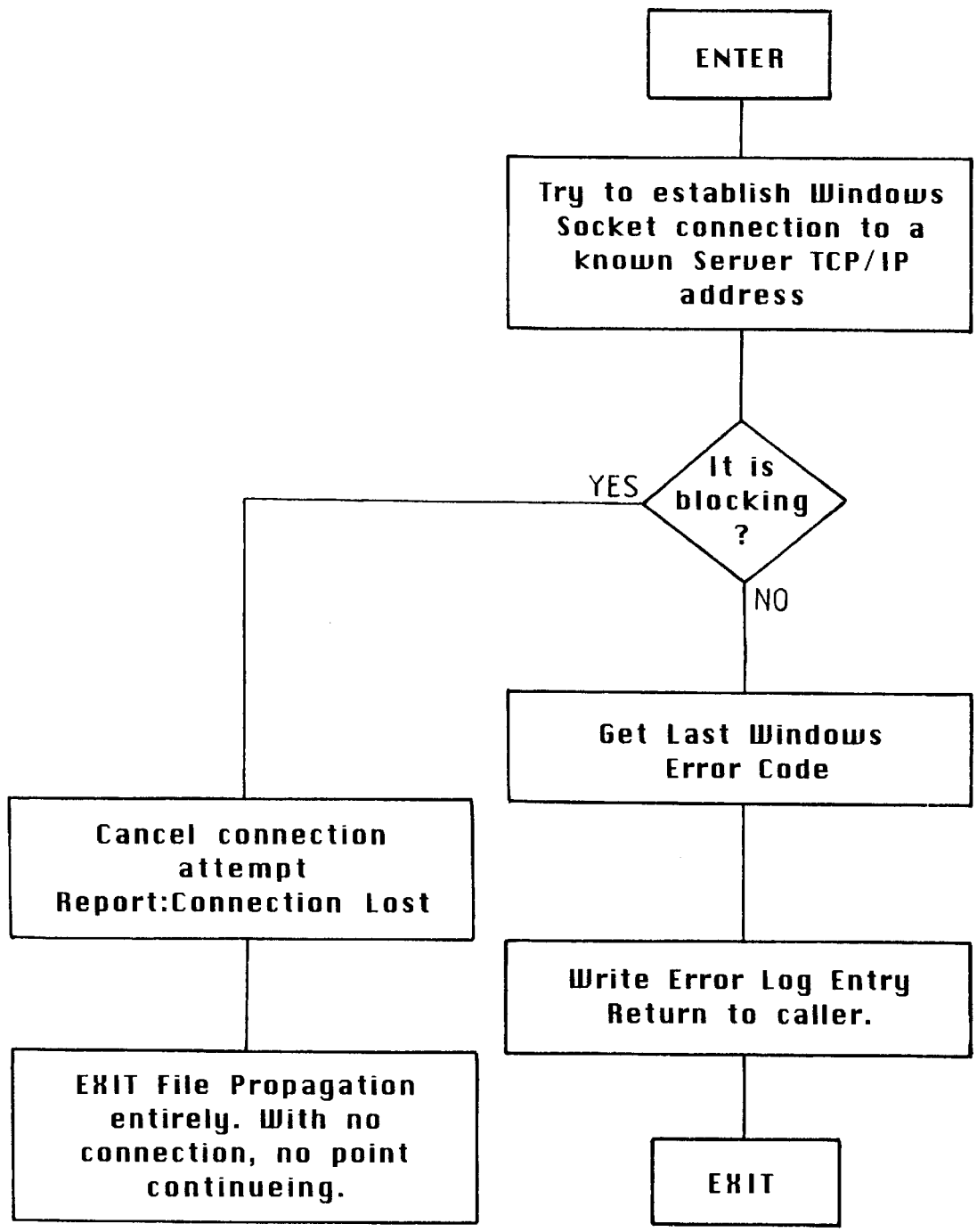
"HANDLE ERROR" ROUTINE       Fig. 4e

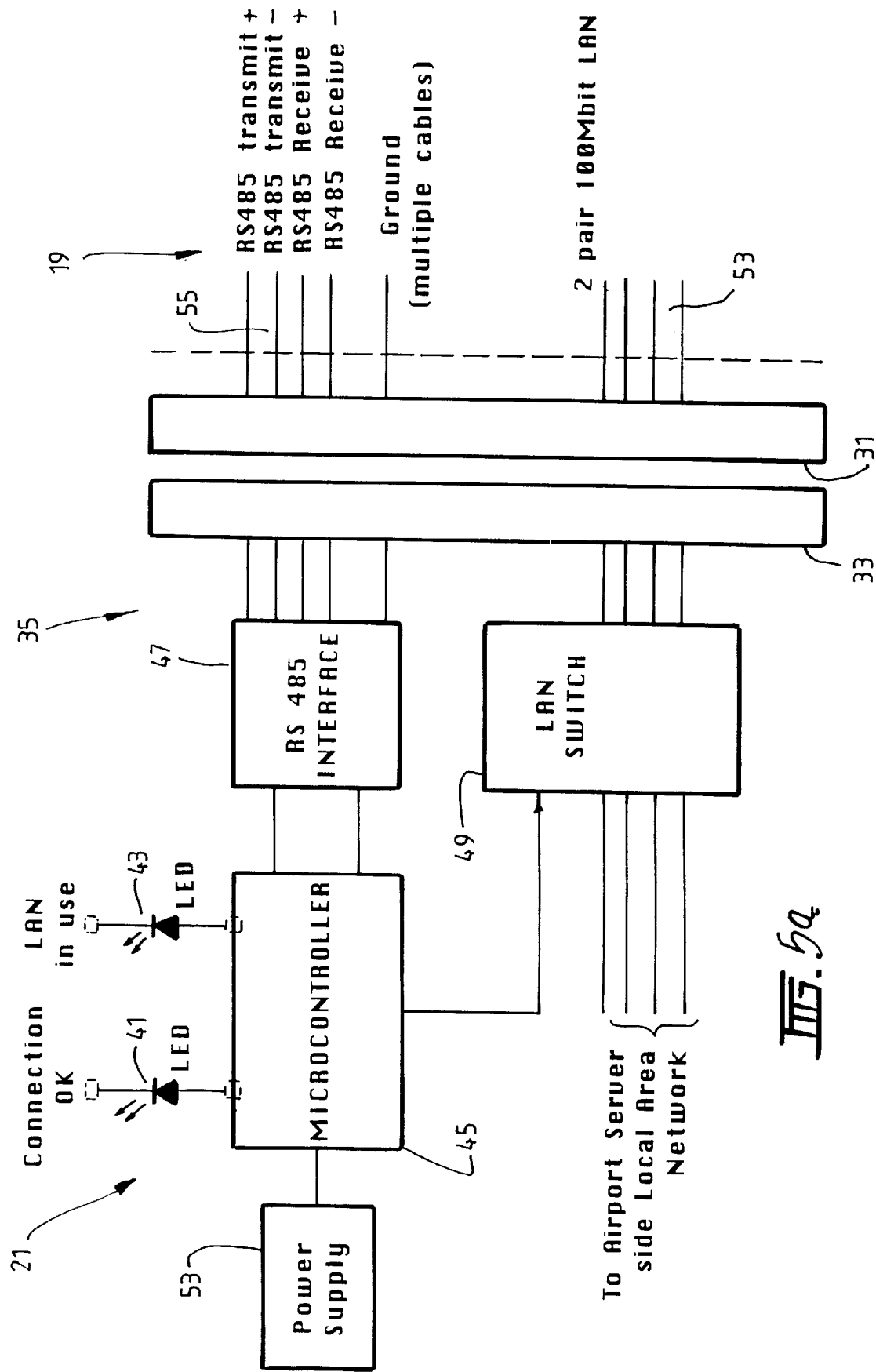

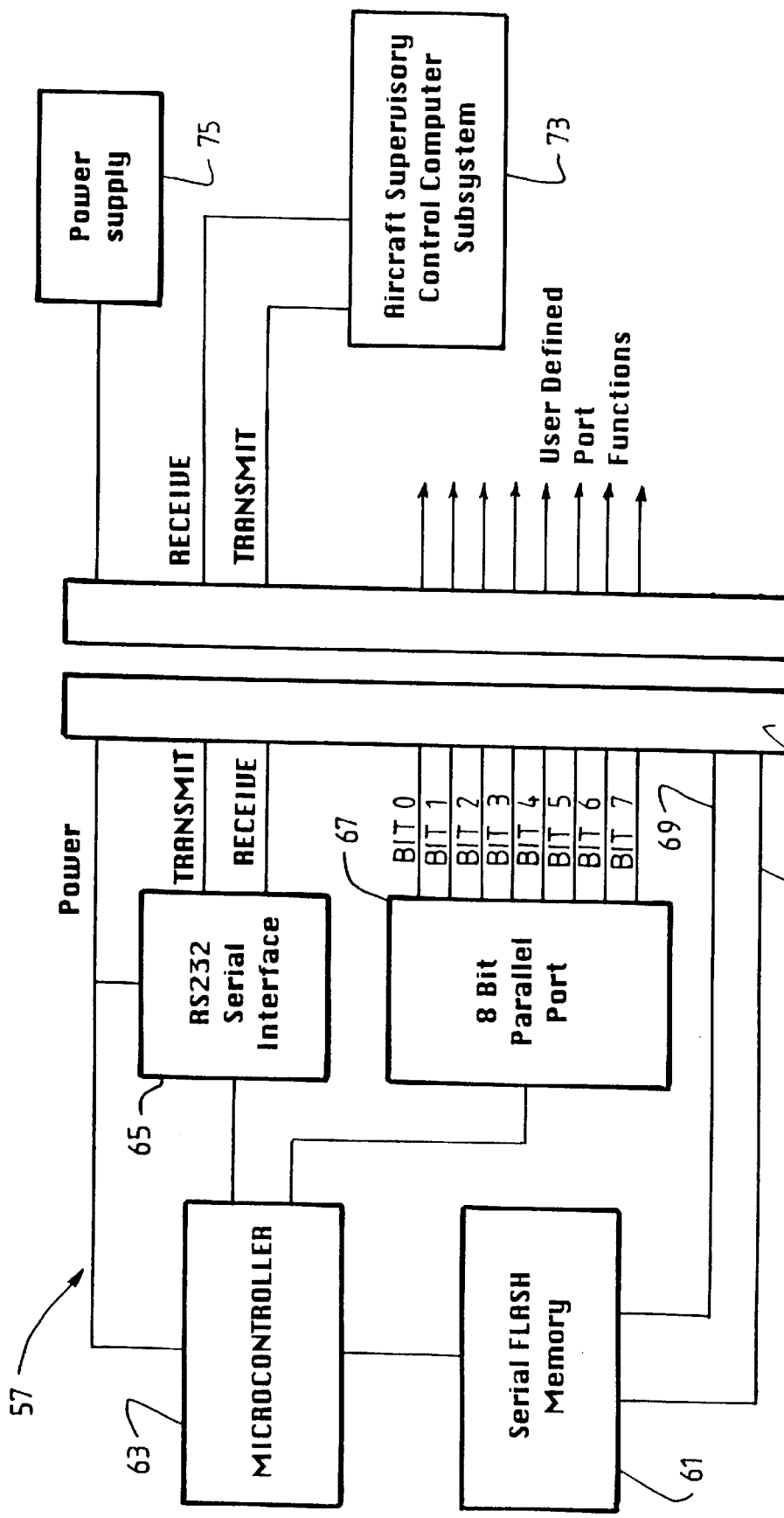

COMPUTER SYSTEM HAVING FIXED COMPUTERS AND MOBILE COMPUTERS

FIELD OF THE INVENTION

This invention relates to a system having fixed computers and mobile computers and relates particularly but not exclusively to such for use in an airline environment where fixed computers can be at airport terminals and mobile computers can be installed within aircraft.

DESCRIPTION OF PRIOR ART

Hitherto, airline systems have provided entertainment services to customers by providing video tapes for video entertainment and audio tapes for audio entertainment. In recent years, it is common to provide video news segments particularly on short duration flights. The production of the necessary numbers of video tapes for this news service presents considerable difficulties particularly as all aircraft within the airline fleet usually require the latest version as soon as possible and usually require an AM and a PM edition. This need has been satisfied by providing relatively large video duplicating facilities at each airport terminal or at least at the major airport terminals. Typically, a video news segment can be provided from a video production house by either being transferred digitally over land lines or by satellite connection to one or more airline terminals. Video tapes are then produced for each aircraft at the relevant airline terminals and then distributed to the aircraft when they visit the terminal.

In recent times it has been proposed that instead of providing video tapes for playback on conventional video player devices within the aircraft, that the video media can be digitally provided and stored in storage mediums such as hard disk drives. There are the same particular problems associated with providing the necessary digital copies in storage mediums such as hard disk drives as for video tapes. Further, hard disk drives are generally not as convenient to use in this environment as video tapes, as hard disk drives are not as easily removable or replaceable in the computer equipment as video tapes are in video player/recorders. Other problems relate to the fact that digitally recorded media such as video and audio is of high quality and copies are indistinguishable from the original source material. Therefore, movie houses and other media houses are concerned that if such media is available digitally it may be illegally copied and distributed and therefore compete with the genuine product. Therefore there are problems in adopting digitally recorded media in an airline environment and in other environments.

OBJECT AND STATEMENT OF THE INVENTION

The present invention attempts to address one or more of the aforementioned problems.

According to a first broad aspect of the present invention there may be provided a method of propagating data throughout a computer system having mobile computers, and a computer server device at a fixed site, said method comprising providing relevant data at said computer server device to be transferred to said mobile computers, making a data exchange connection between a mobile computer and said computer server device when a mobile computer visits said site, providing software authorisation checking when said data exchange connection is made to determine if said mobile computer is an authorised computer, conducting software checking to determine if relevant data resident in said computer server device is more recent than the relevant data in said mobile computer, invoking further software to transfer the relevant data from said computer server device to said computer if it is more recent than the relevant data in said mobile computer, and if the relevant data in said mobile computer is more recent than the relevant data in said computer server device, invoking said further software to transfer the relevant data from said mobile computer to said computer server device, and repeating the process with further mobile computers when they visit said site whereby said relevant data can be propagated.

It is particularly preferred that said authorisation, said determining, and said data transfer be provided automatically upon making said data exchange connection.

It is particularly preferred that there be a plurality of fixed sites each with a respective computer server device, and wherein when relevant data is required to be propagated it be first introduced to a computer server device at one of said fixed sites, and that it be propagated to a further one of said plurality of fixed sites by being transferred to a mobile computer visiting said one site and then to said further one of said plurality of sites when said mobile computer visits said further one of said plurality of sites, thereby providing said further one of said plurality of sites with the relevant data for propagation to further mobile computers which visit said further one of said plurality of sites.

It is particularly preferred that said system be an airline system having airport terminals each with a respective computer server device, and wherein aircraft of said airline each have a respective computer fitted therein so as each aircraft makes a journey the computers therein will be mobile.

It is also particularly preferred that at least one of the computer server devices be connected to receive relevant data from an external source to said system.

It is particularly preferred that said external source be a media production house which has a data exchange link with said computer server device.

It is further particularly preferred that said relevant data be data for use in providing entertainment and/or information to passengers of the aircraft.

It is further particularly preferred that each airport terminal have a LAN and that each aircraft boarding area at said airport have a respective computer server connector connected in said LAN, and wherein when data is transferred to said computer server, it will be made available at all other computer server connectors in said LAN which are for connecting with mobile computers.

It is also particularly preferred that when data is being transferred that it transfer to unoccupied file area in storage memory, and that after transfer, software is invoked to determine if all data to be transferred has been transferred and only then to cause that transferred data to be useable in lieu of any older data which may be in the storage memory.

It is particularly preferred that the transferred data be checked to determine that all data intended to be transferred has been transferred and then deleting the data it is intended to replace. It is particularly preferred that the transferred data be given the same file name or a same part file name as any data deleted.

It is particularly preferred that said computer server and the storage medium at the computer server be retained at a secure area at said airport.

According to a second broad aspect of the present invention there may be provided a method for making authorised computer connection between two computers to allow for data transfer therebetween, comprising providing devices on each side of the connection dedicated to security checking, one of the devices being an Initiator for initiating a security checking request, and the other of the devices being a Respondent for receiving a security checking request from an Initiator, and for providing a pass-through command in response to such request, and only in response to said pass-through command allowing data to pass between the two computers.

Preferably the allowing of data to pass occurs by operation of switches within each of said devices which interconnect data exchange lines at each computer.

Preferably said security checking request and said path-through command are provided on lines separate to said data exchange lines.

Preferably there is a password exchange between said two devices during said security checking request.

Preferably the Initiator is configured to check if the Respondent is still connected during the passing of data and to terminate the passing of data if the Respondent is not connected.

Preferably the Respondent is configured to check if the Initiator is still connected during the passing of data and to terminate the passing of data if the Initiator is not connected.

Preferably, one of the computers is in a LAN and that the device connected with that computer is configured as a Respondent, and the other computer is a mobile computer and the device connected with that computer is figured as an Initiator.

Preferably said one of the computers is configured to periodically poll the device connected therewith and if the device is in a pass-through mode to only then initiate a procedure to allow data transfer. Preferably said polling occurs not only prior to data transfer but also during data transfer, and if said device is not in a pass-through mode terminating the passing of data.

According to a third broad aspect of the present invention there may be provided a personality module for use with a computer device to instruct the computer device as to the personality of the environment in which the computer device is to operate so that the external inputs of the computer device and the external outputs of the computer device will be configured to that environment, said personality module having a connector for mating with a corresponding connector connected with said computer, said personality module also having a memory device which is pre-stored with personality information of the environment for the computer device, said computer device having a start-up routine which interrogates said personality module and then configures said computer device for that environment according to the personality information in said memory, the arrangement being such the identical computer devices can be provided in many different environments and can be swapped from one environment to the other and be configured for the new environment by the personality module for that new environment.

It is particularly preferred that the personality module be physically attached to a part of said environment so that it is a part of said environment thereby enabling any one of such computer devices to be connected therewith when said computer device is to be used in that environment.

It is further particularly preferred that said personality module have a micro controller connected with said memory, and a serial port interface, and a parallel port interface, said micro controller having software which is responsive to inputs from said computer device via said serial port interface to provide access via said parallel port interface to the contents within said memory.

It is particularly preferred that said memory have write protection means, and that said write protection means be defeated when said personality module is connected with a memory programming device, and invoked when said personality module is connected with said computer device.

It is particularly preferred that the connector which connects with said personality module have means therein to either defeat said write protection or invoke said write protection.

It is further particularly preferred that said environment be in an airline system and each environment be a respective aeroplane.

BRIEF DESCRIPTION OF THE DRAWINGS

In order that the invention can be more clearly ascertained examples of preferred embodiments for use in an airline system will now be described wherein:

FIG. 2 comprising

FIG. 3 comprising FIGS. 3a through 3g is a software flow diagram showing file movement.

FIG. 4 comprising FIGS. 4a through 4e is software flow diagrams showing file copy procedures and error handling procedures.

FIG. 5 comprising FIGS. 5a and 5b is a block schematic circuit diagram showing devices used when interconnecting a computer server and a mobile computer to check that the computers are authorised to transfer data therebetween.

FIG. 8 is a block circuit schematic diagram showing a personality module configuration for use in the system.

DETAILED DESCRIPTION OF PREFERRED EMBODIMENTS

Figure 1:
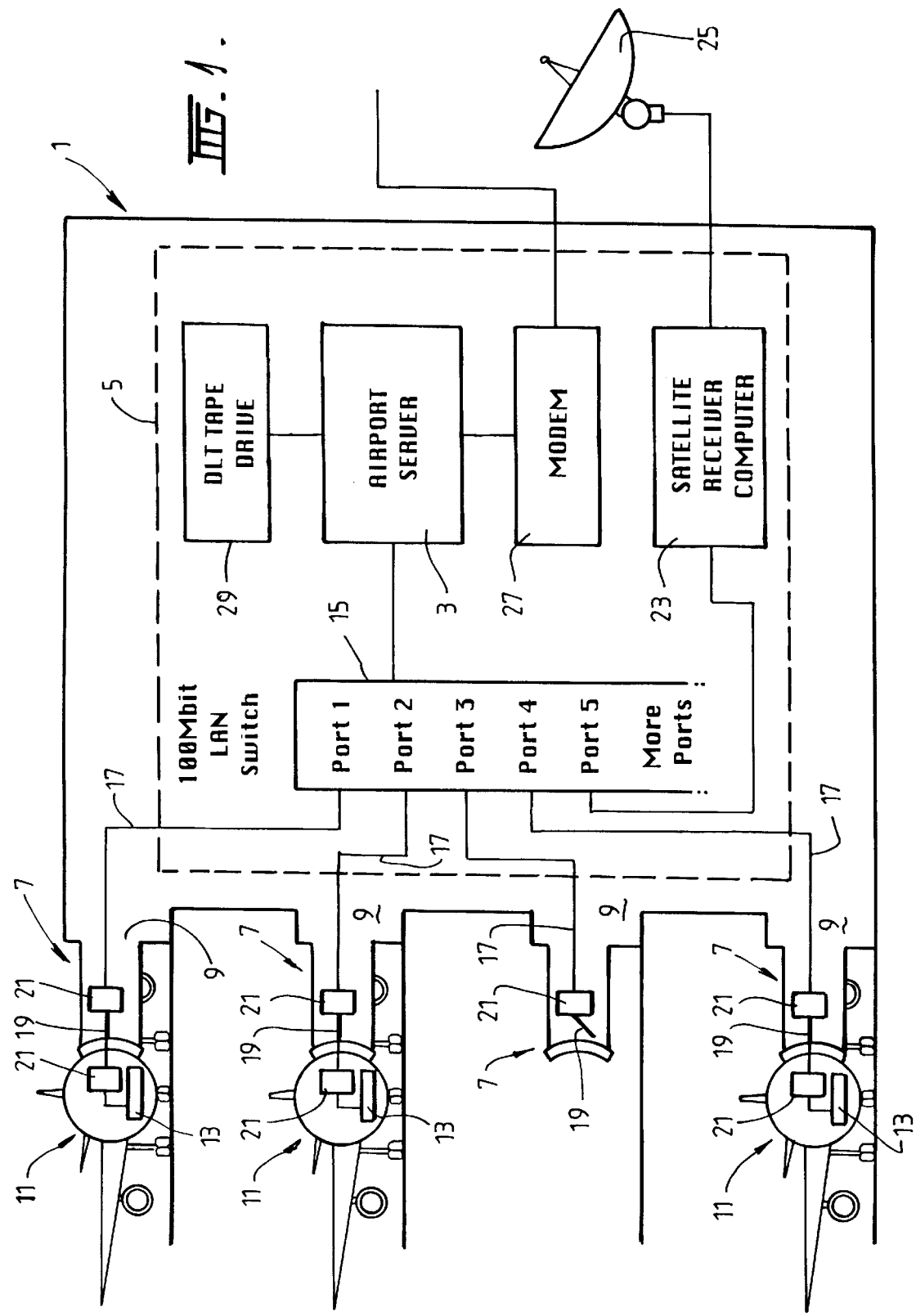
FIG. 1 is a block schematic diagram conceptually showing a computer server at a fixed airport site and a number of mobile computers within aircraft which visit the site.
Figure 2A:
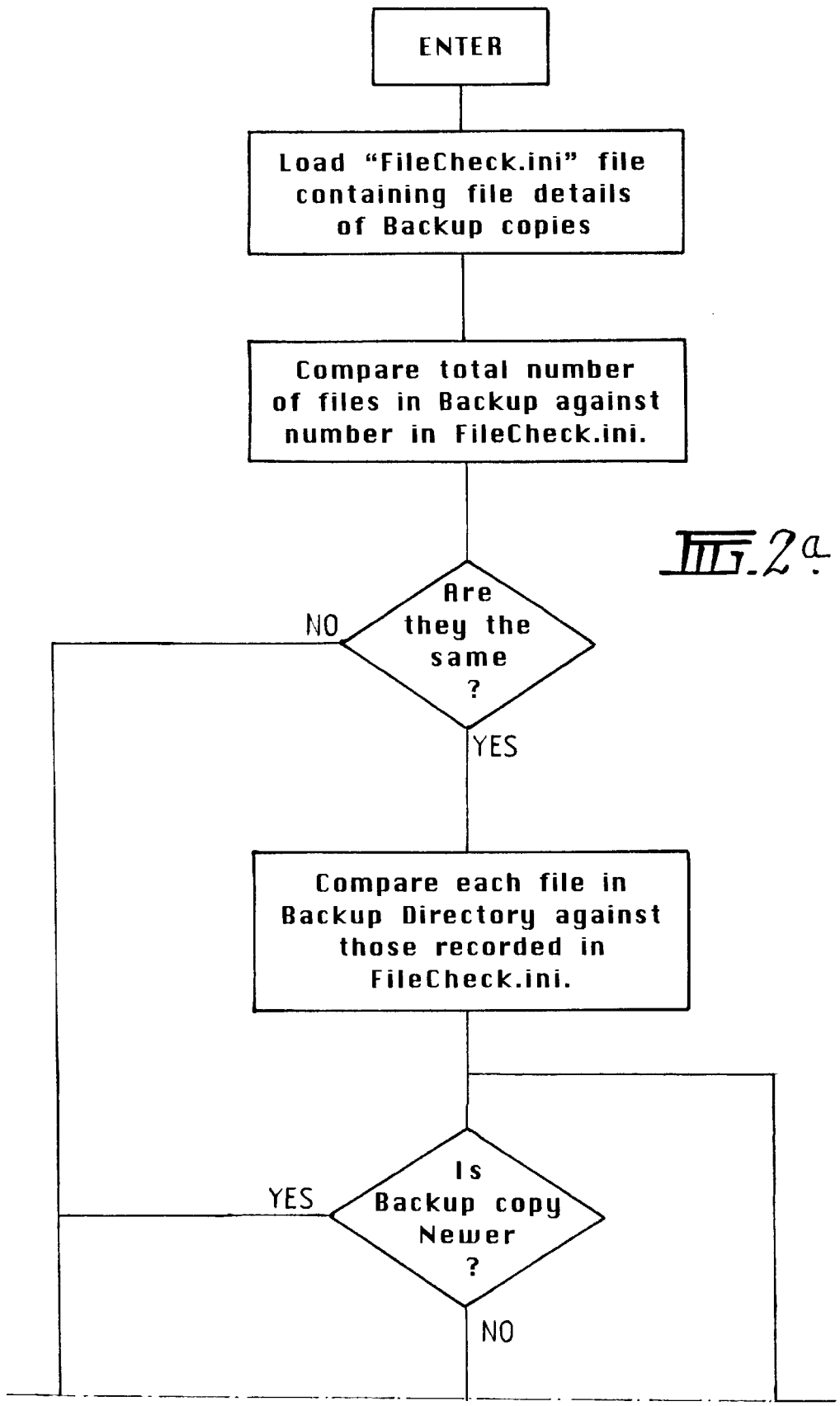
FIG. 2a through 2d is a software functionality flow diagram showing start-up file verification.
Figure 2B:
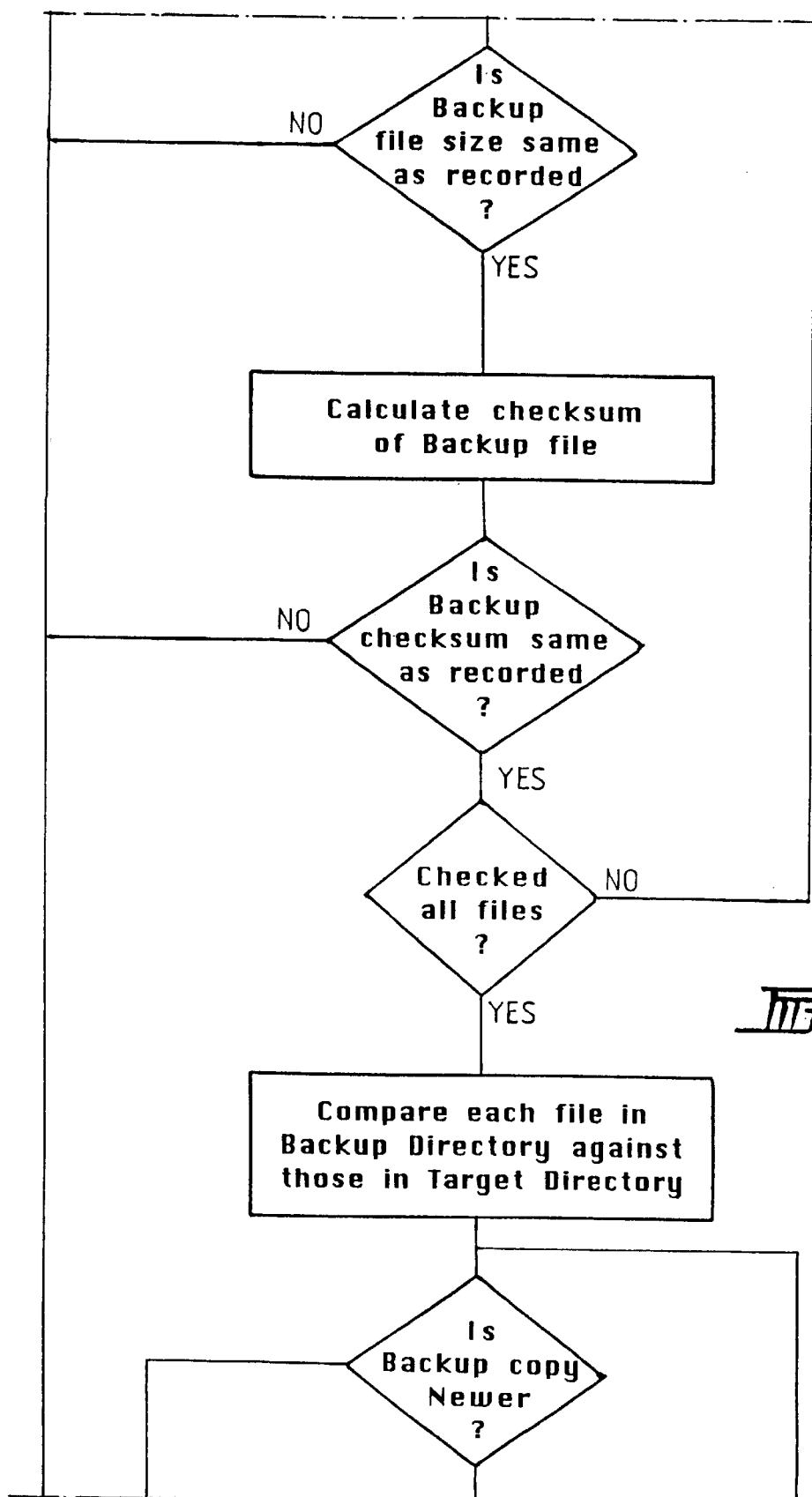
Figure 2C:
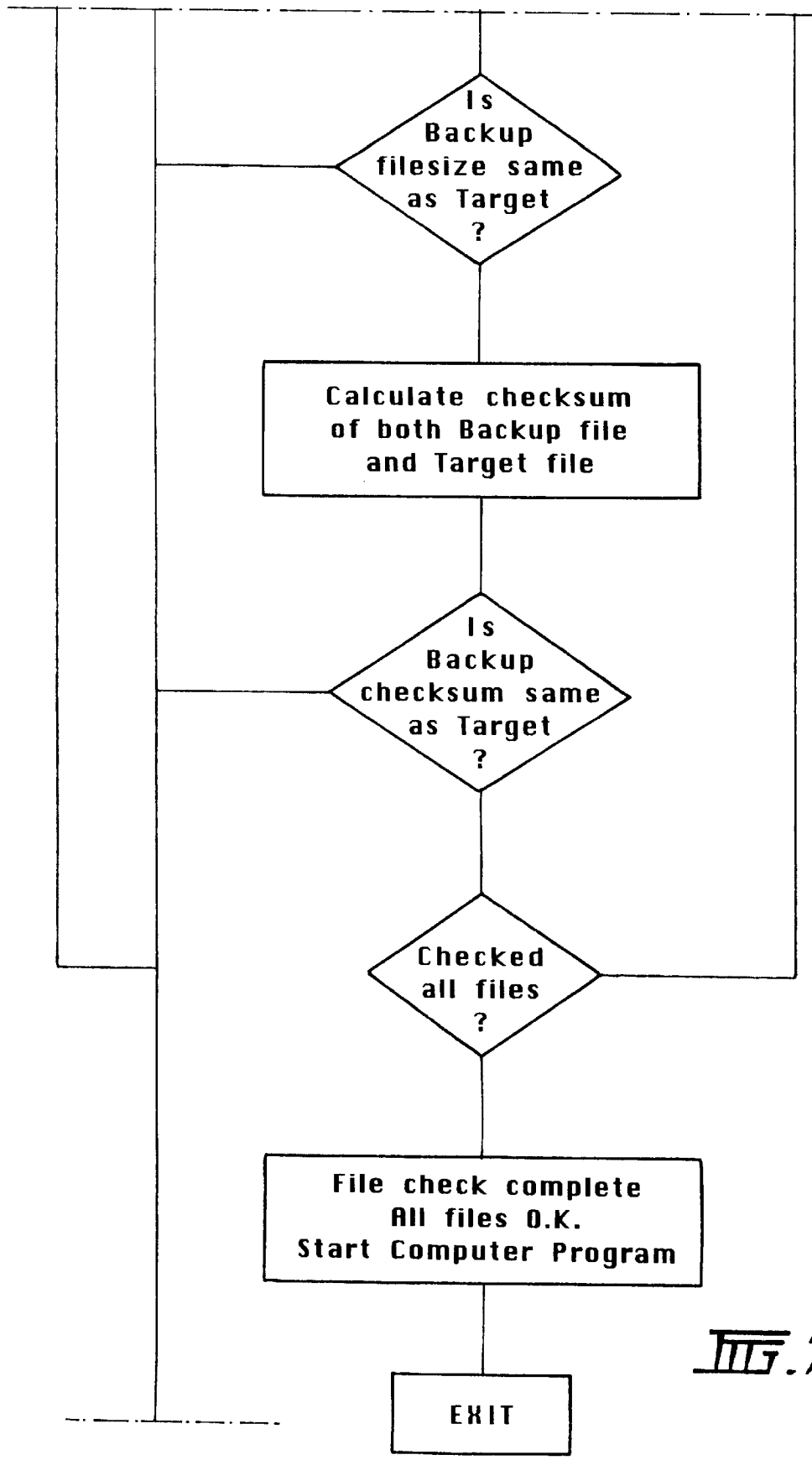
Figure 2D:
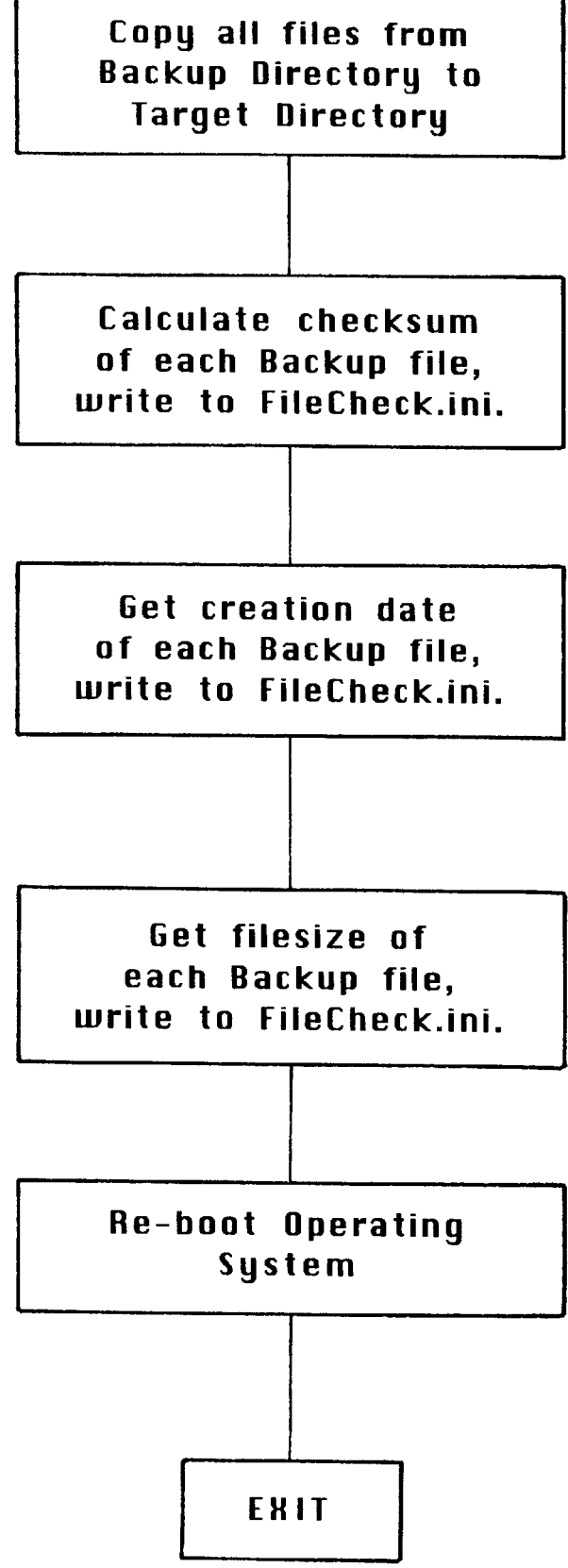
Figure 3A:
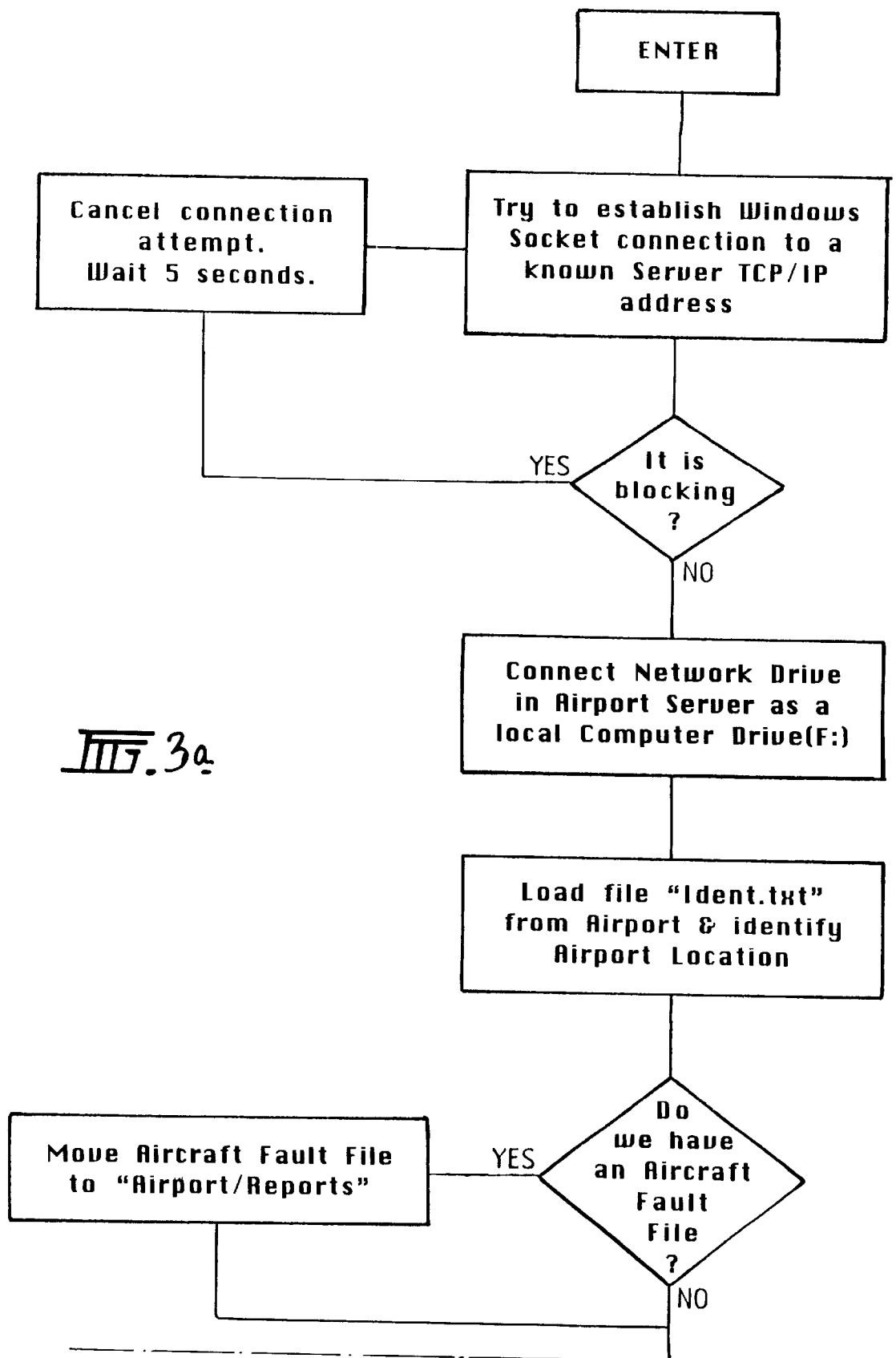
Figure 3B:
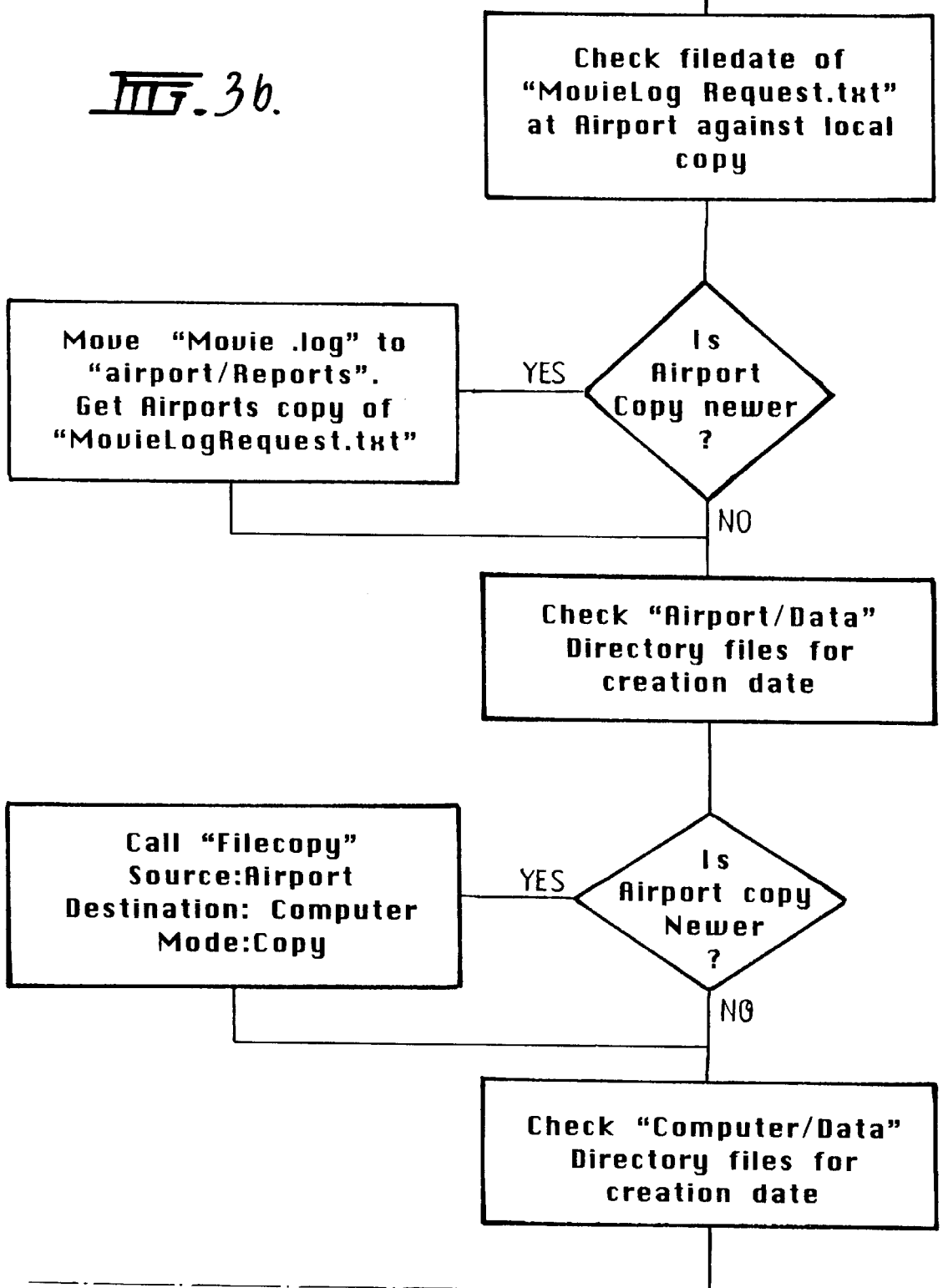
Figure 3C:
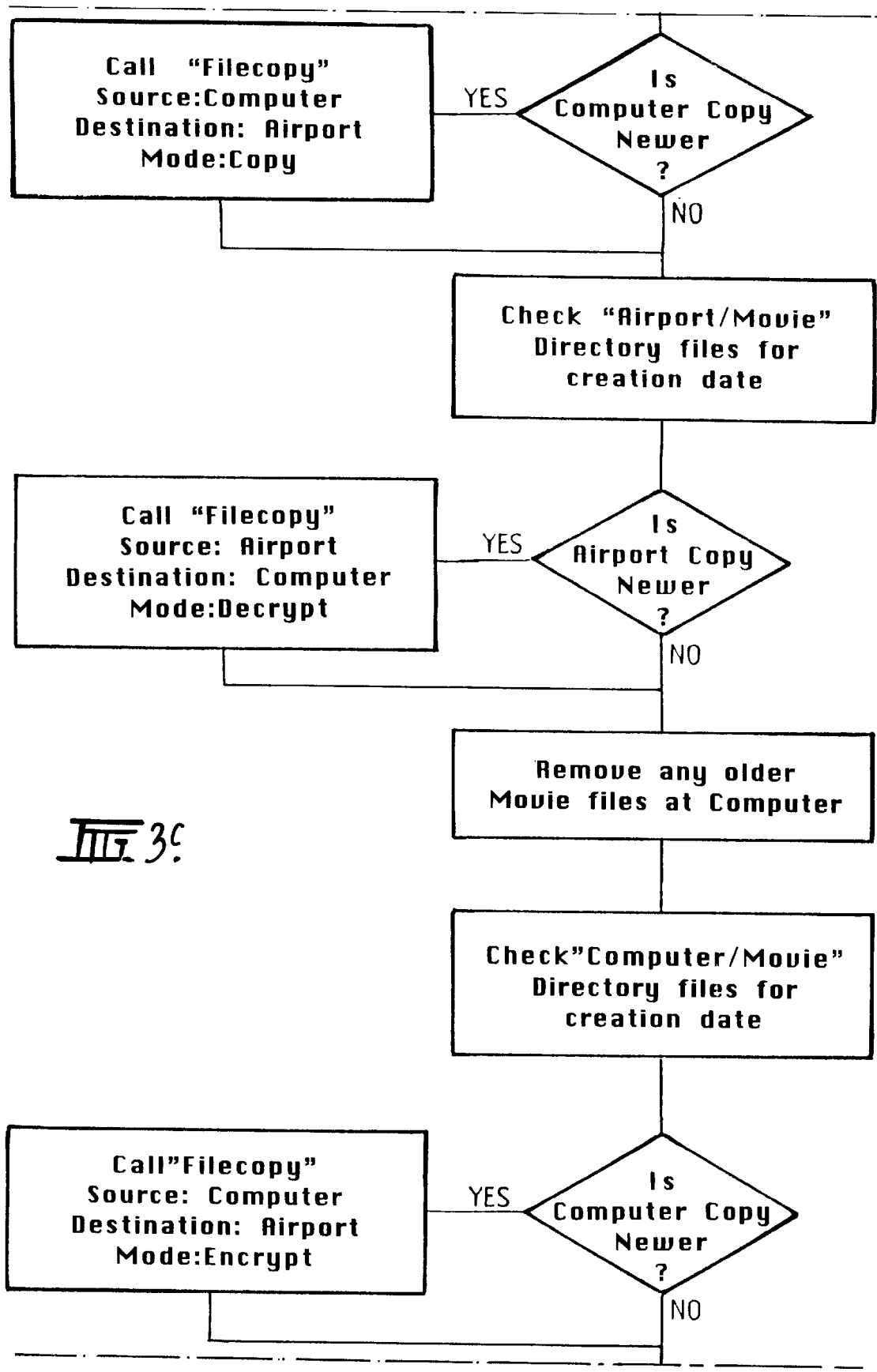
Figure 3E:
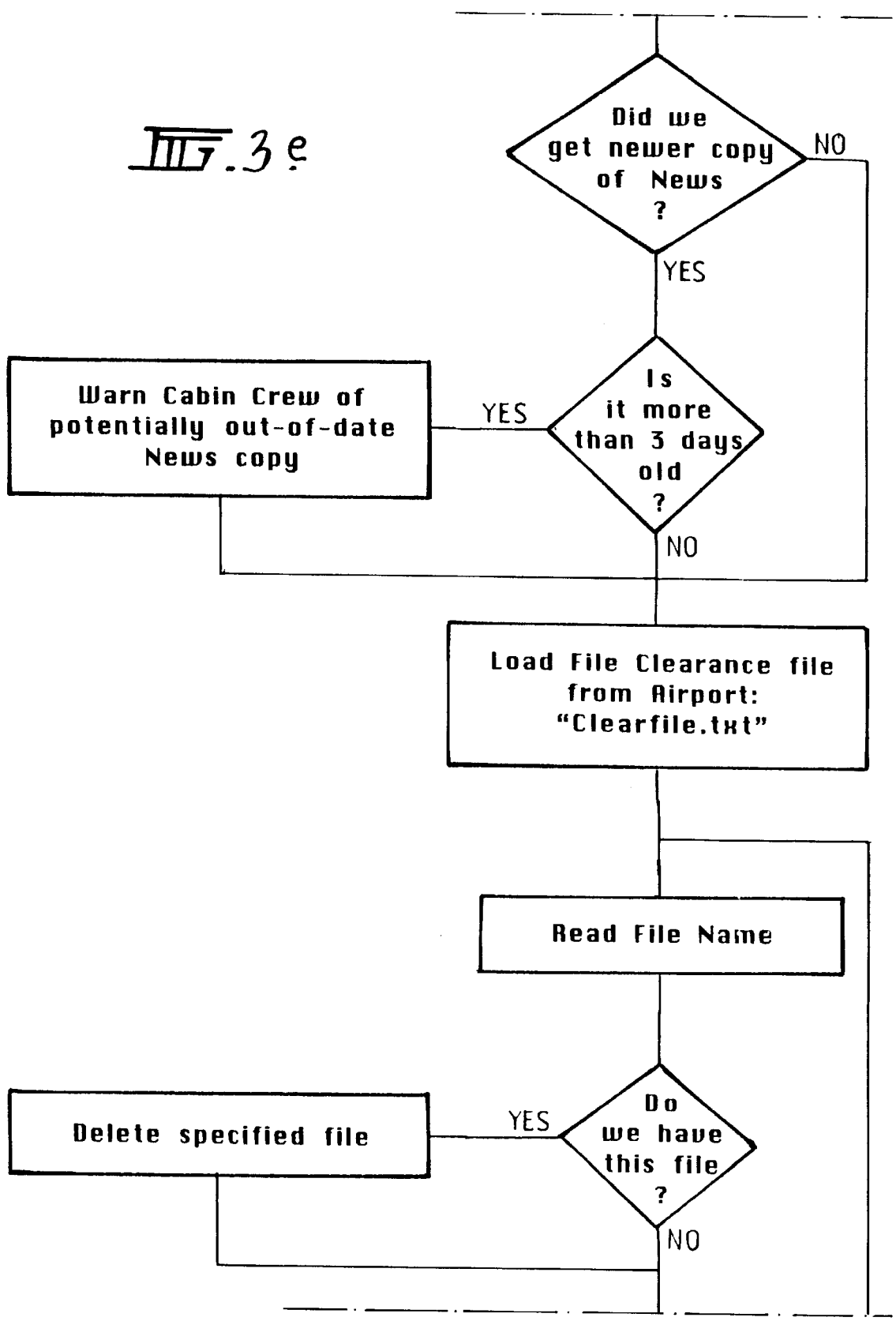
Figure 39:
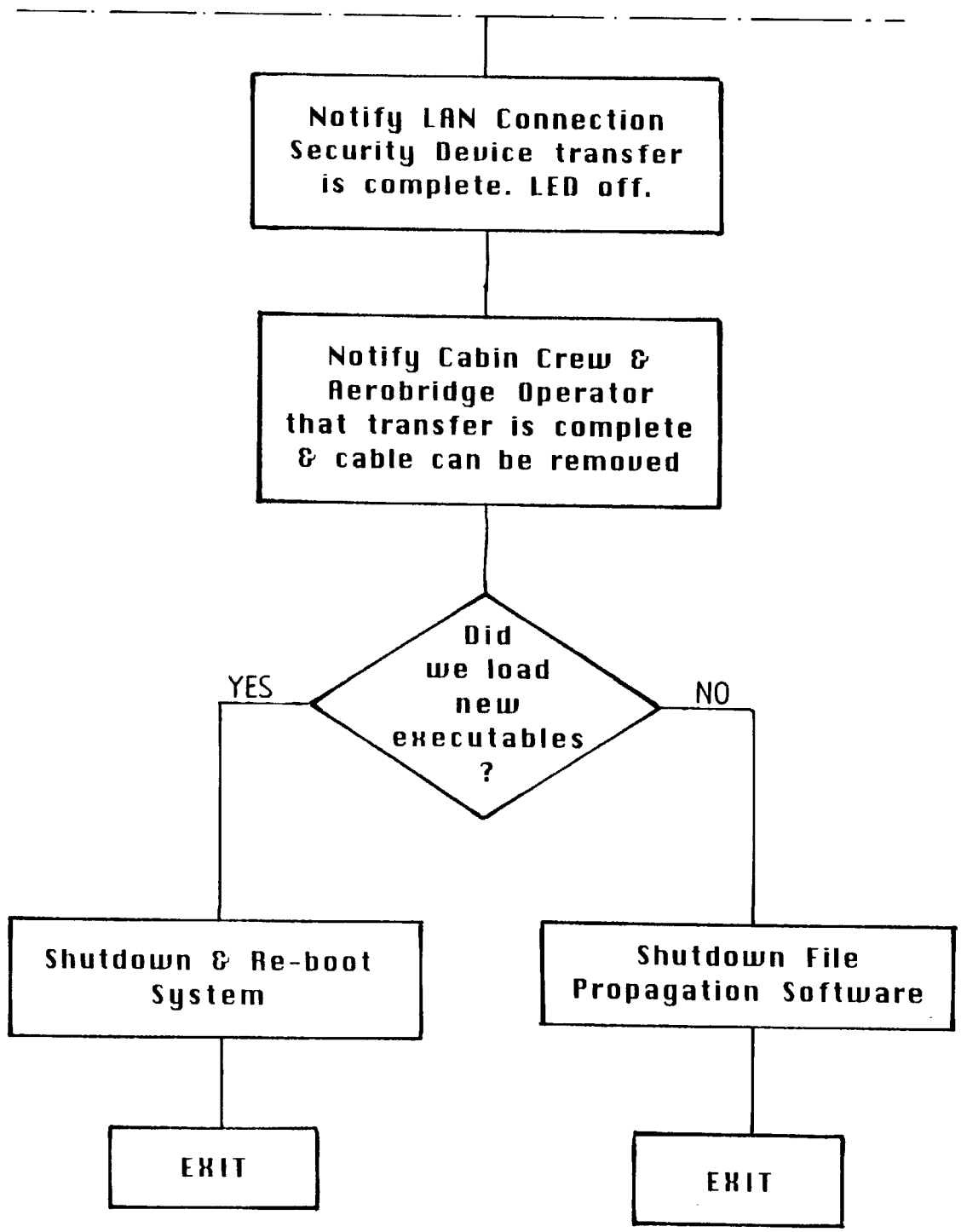

Referring firstly to FIG. 1 it can be seen that there is provided an airline system 1 which has a computer server device 3 provided within a secure area 5 within an airport. The airport has a number of aircraft boarding areas 7. In this example, each boarding area 7 is provided with an aerobridge 9 which enables passengers to enter and exist the aircraft 11. It should be realised that a boarding area 7 may be a designated parking area for aircraft 11 on a special area of the tarmac at the airport terminal.

Each aircraft 11 has a mobile computer 13 suitably mounted within a storage rack therein (the storage rack has not been shown). When the aircraft 11 visits the airport it is parked at a boarding area 7. Connection can therefore be made between the mobile computer 13 within the aircraft 11, and the computer server 3 at the fixed site at the airport terminal. The airport server is provided within a LAN. In this configuration, the airport computer server 3 is provided within a 100 Mbit LAN switch 15 which has as many ports as required to provide the necessary services in the LAN. Each of the ports within the LAN switch 15 is connected via cabling 17 to the boarding areas 7. Thus, in this case, the cabling 17 extends to the mouth of the aerobridges 9. Typically, the cabling 17 is either copper cabling or fibre optic cabling depending on the distance between the LAN switch 15 and the particular boarding areas 7. The cabling terminates at the aerobridges 9 and such termination will be explained in due course. An interconnect cable 19 can then make connection between the cabling 17 and the mobile computers 13 within the aircraft 11. LAN connection security devices 21 are provided at the aerobridge 9 and also within the aircraft 11 and these are used to ensure authorised connection. The details of this will be explained in due course. A satellite receiver computer 23 with a satellite receiver dish 25 is connected with the airport server 3 through the LAN switch 15. A modem 27 is also connected with the airport server 3. Media data can be transferred to the airport server 3 in one of three possible ways:

1. by receipt of digital data signals from the satellite receiver 23,
2. by receipt of digital data through the modem 27 or
3. by receipt of digital data exchange between the mobile computer 13 in an aircraft 11.

The modem 27 also enables a distant authorised operator to maintain the server 3 remotely. It also permits errors and faults and other reports to be faxed directly to responsible parties.

Typically, the digital data for video media is MPEG encoded so as to compress the digital file size.

Both the airport server computer 3, and the mobile computers 13 have suitable storage means for the digital data. As digital data for video can be quite large, the airport server computer 3 and the mobile computers 13 preferably operate with Windows NT as the operating system software. In this way, the storage medium does not need to be partitioned into 2 giga byte modules which is the maximum size permitted under other operating systems such as Windows 95. Thus, for media such as video, audio and games, the storage capacity will be suitably chosen. Computer server 3 desirably has a RAID array of hard disks so as to provide file protection in the event of disk failure. A DLT tape drive 29 is connected with the airport server computer 3 for loading information into the storage array by a program content supplier such as a media production house.

As previously stated, the content of the digital data is to be protected and therefore the cable 17 can be retained within metal conduits. The cable ends at the aerobridges 9 provide the only open access to the digital data at the airport itself. The appropriate connector on the mobile computer 13 within the aircraft 11 provides a further open access connection to the digital data. The LAN connection security devices 21 provide security for access and this will be referred to directly. The computers 13 are not provided with any ports to enable connections of keyboards or mouse devices and therefore the only connection to the mobile computers 13 is via the connector within the aircraft 11. Thus, if a mobile computer 13 is stolen access to the files would be extremely difficult because of the absence of the other required components in the total system. Further, if the storage drives were to be removed from the mobile computers 13 it would be almost impossible to gain access to the files as Windows NT file security applies and these drives (there are multiple drives within the mobile computer 13) are striped as part of the RAID system. Without a complete RAID system using the same RAID set-ups, access would be extremely difficult.

Accordingly, data can be propagated throughout a computer system by having mobile computers 13 and a computer server 3 at a fixed site being the airport terminal. When an aircraft 11 arrives at the terminal, it parks at the boarding area 7—in this case the aerobridge 9—and the interconnect cable 19 is connected to the mobile computer 13 and to the cable end 17 at the aerobridge 9. Software authorization checking is then performed to determine if the mobile computer 13 is an authorised computer for connecting with the computer server 3. Further software is invoked after authorisation checking to determine if relevant data resident in the computer server 13 is more recent than relevant data in the mobile computer 13. In other words, is the video, audio or other media content resident at the airport computer server 3 more recent than the corresponding relevant data in the mobile computer 13 or vice versa. If the data is more recent, there will be data exchange either between the mobile computer 13 and the computer server 3 or vice versa. In this way, the aircraft 11 having a mobile computer 13 can act as a means for propagating data throughout the system 1. Thus, as aircraft leave the airport terminal and fly to further airport terminals, they will carry the most recent data. When the aircraft arrive at the further airport, and make connections with the airport computer server 3 at that airport, a similar procedure will repeat. In this way, there can be rapid distribution and propagation of data throughout an airline and its aircraft.

The authorization, the determining of how recent the data is, and the data transfer are all provided automatically upon making the connection with the interconnect cable 19. This will be described shortly.

In an airline system it can therefore be seen that there are a plurality of fixed sites represented by each of the airport terminals, and that when data is required to be propagated it can be first introduced to a computer server 3 at one of the sites. Such data can then be propagated throughout the system by use of the aircraft 11. Typically, one or more airports will have a means to receive relevant data from an external source such as via the satellite computer 23 or by other means. Conveniently, a media production house can communicate with the computer server 3 by a data exchange link such as via the satellite computer 23. It can also be seen that when data is transferred to the computer server 3, it will be available via the LAN to all computer server connections in the LAN which are used for connecting with the mobile computers 13.

To enhance security, the data files are encrypted and stored in encrypted form within the storage areas of both the mobile computers 13 and the computer servers 3. An extended version of the DES encryption system is preferably used. When the files containing the data are to be used they are decrypted. The data files do not exist anywhere in a decrypted form except in the computers 13 themselves.

File Verification Upon Startup

As part of the file propagation software in the mobile computers 13, a software module operates at system startup to verify the program executables and data files before the main program is launched.

If any program file corruption occurs, other than physical damage to the Core Drive that holds the operating software, it is most likely to be inflicted upon any program or data files that were in use at the time of the incident occurring. For this reason, a totally separate copy of all these files is held in a backup directory for use in an emergency.

The Startup File Verification Module (SFVM) itself resides in a separate directory and has its own file, "FileCheck.ini" that holds pertinent details about the files that make up the operating system and its accompanying data files. When the computer 13 is powered on, the SFVM is loaded first, In Phase 1 it then loads the FileCheck.ini file and compares the following details of the files in the backup directory against those recorded in FileCheck.ini:

1. Total number of files present.
2. Size of file.
3. Date of creation of file.
4. Checksum of all bytes in the file.

If this passes the test, it is noted and no action is taken. If the test fails, the SFVM skips the following Phase.

In Phase 2, the same file details are compared between the Backup directory and the main executable file directory, which should contain exactly the same files. If this test passes, the file system is OK and the program is launched. If it fails, the result is the same as failure of the first phase. All files in the backup directory are copied into the main directory. The FileCheck.ini file is then fully re-created from the details of the files in the Backup directory and this file is then saved. The mobile computer 13 is then launched.

In this way, new versions of the executables and data files are loaded firstly into the Backup directory and when the SFVM is run, it will automatically fail phase 1 and copy the files into the mobile computer 13 directory, re-build FileCheck.ini and start the computer 13.

The progression of this module is shown in FIG. 2.

File Propagation

There are five categories of files that make up the computer 13 system. All five categories can be automatically updated and carried to other locations. All categories must also be periodically updated, some as frequently as twice daily, others perhaps one a year.

1. Audio/Video and Audio Only Files.

The audio/video files are MPEG encoded files such as sitcoms, movies, advertisements, promotions etc. that form the basis of the television based in-flight entertainment system. The audio only files contain the programming for the separate multi-channel audio system through headphones at each seat. This can be up to 12 stereo channels in the implementation. The news program file is updated twice daily, sitcoms and movies every two weeks or monthly.

2. Reports and Error Files.

These files are generated aboard the aircraft within the computer 13. Examples are Error Log files that report problems that the computer 13 encountered during its operation, and Fault Report files that allow the cabin crew to report faults in aircraft equipment. Also, it is necessary to keep a log of movie screenings as these are paid for per-viewing.

3. Entertainment Scheduling Files

These files contain the schedules that determine what programs will be played in-flight according to the route being flown, the direction of the flight and the length of time in the air. These are updated at the same frequency as the program files.

4. Data Files.

These files contain data such as available routes, flying time etc. There are also background images and announcement text files that may change according to the policies of the airline.

5. Program Executables

Executables are the actual program files that comprise the computer 13 software. It is permissible to alter the operating software to make changes in the way the computer 13 operates and have this distributed to all aircraft in the fleet in the same way as other files.

LAN Polling

The computer 13 File Propagation Software has to be able to recognise the presence or absence of the LAN connection to an Airport computer Server 3, as for a large part of the time, when the aircraft is away from the terminal, the connection is not present.

The system is continually polling the LAN to see if a specific device is present. This is done using the TCP/IP (Transport Control Protocol/Internet Protocol) protocol and the Windows Sockets functions. This polling is carried out every five seconds and must execute rapidly so as not to hinder other operations. The program is attempting to establish a socket connection with a known IP address and, if this connection is not successfully established within a very short time in Windows terms, it blocks, and the socket is closed again. If successful, the system maps the Airport Computer Server 3 drive system to a local drive and begins file transactions, subject to correct user name, password and privileges.

File Propagation Requirements

The File Propagation Software is required to cope with a number of unusual circumstances and at the same time, accurately report any problems it encounters so that corrective action can be taken.

Firstly, it cannot assume that the LAN connection, once established, will be there as long as necessary to enable complete file transfer. The aircraft may need to depart before all file transactions are complete and the interconnect cable 19 will be disconnected by the Aerobridge operator.

Next, it must check that there is sufficient drive space available at either end for the transfer. If its own internal drive space is full, it must place an Error Log entry on the Airport Computer Server 3 stating this so action can be taken. If the airport computer server 3 is full, it will try to place the Error Log on it, and failing this, will carry it to the next airport and place it there. Either way, action can be taken.

Also, it must be vigilant in cleaning up any temporary or unwanted files so that there will be ample free drive space to take on new material. If the interconnect cable 19 is disconnected before a file transfer is completed there may be a temporary file left in the store and this needs to be deleted at the end of the process.

Another feature is the ClearFile.txt file that it may find on any airport computer server 3. This file contains a list of files that are no longer required, and will have been placed there by an Administrator. If it finds this file, it will delete any files listed in it, providing it does have those files on-board.

In moving files between itself and the airport computer server 3, it must ensure that any program video or audio files are encrypted or decrypted as necessary. The only place that decrypted files are permitted to remain is in the mobile computer 13 as stated previously. When they are moved outside of this environment they must be in an encrypted form.

Finally, when loading new movie or sitcom files, it must ensure that a valid replacement file is loaded on board before deleting the previous version, so that programming can continue until a newer program is available in the store.

The operation of this software is show in FIG. 3.

In the main software module, a separate File Copy routine handles all aspects of the copy operation including:

1. Checking for sufficient space on the destination drive.
2. Two primary modes of operation, Copy and Move, where the original is deleted.
3. Two secondary modes, encrypt and decrypt where files are encrypted or decrypted as required.
4. Creation of temporary files so the originals remain until the copy process is complete.
5. Deletion of original once copy is complete.
6. Renaming temporary file to original name.
7. Copy process failure reporting.

Within the File Copy module, a further sub-module handles the situation where any of the copy, delete, encryption, decryption or rename processes fail. It primarily checks to see if the reason is disconnection of the LAN, and if not, extracts the appropriate Windows error code and logs it in Error.log.

Figure 4A:
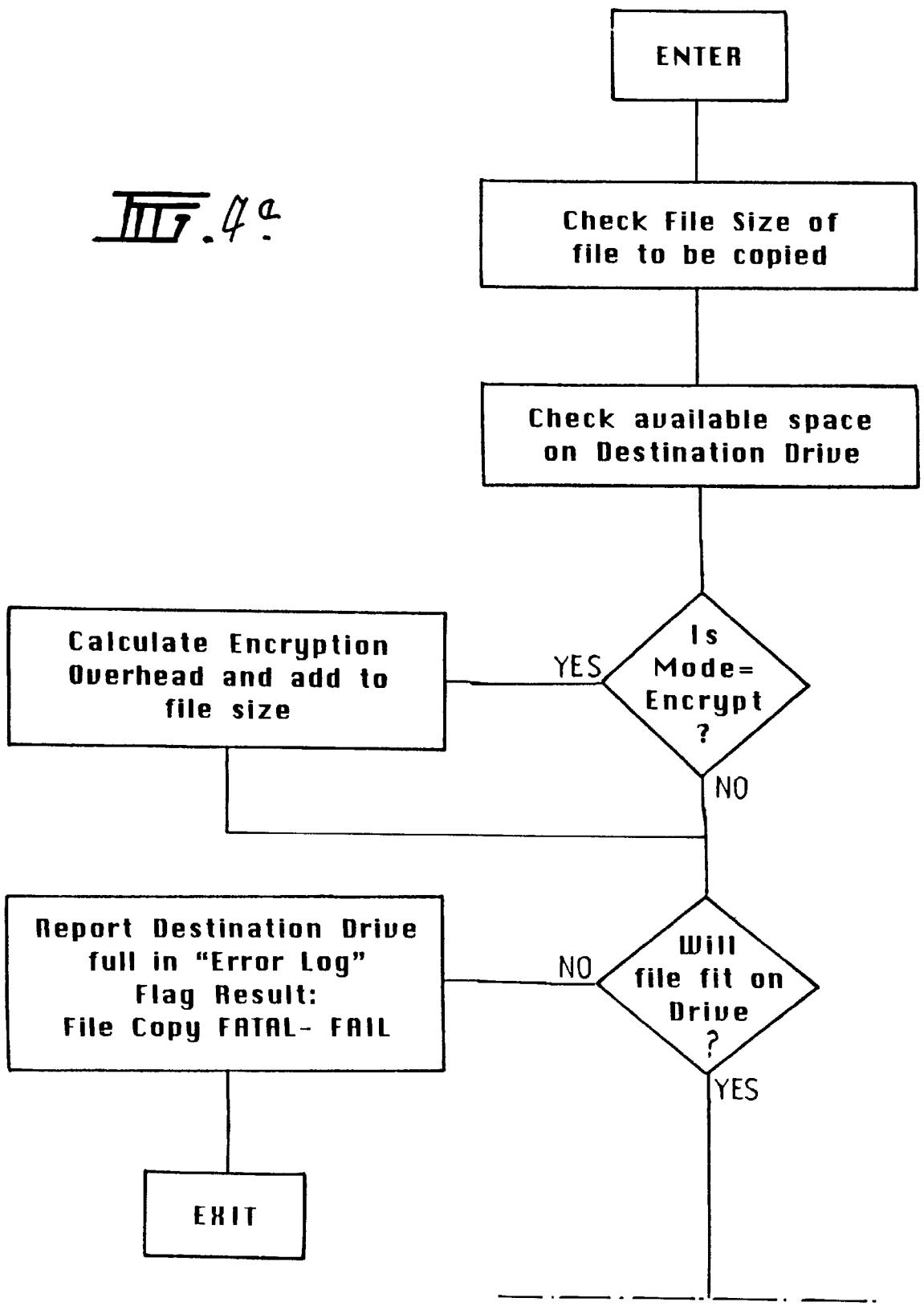
Figure 9B:
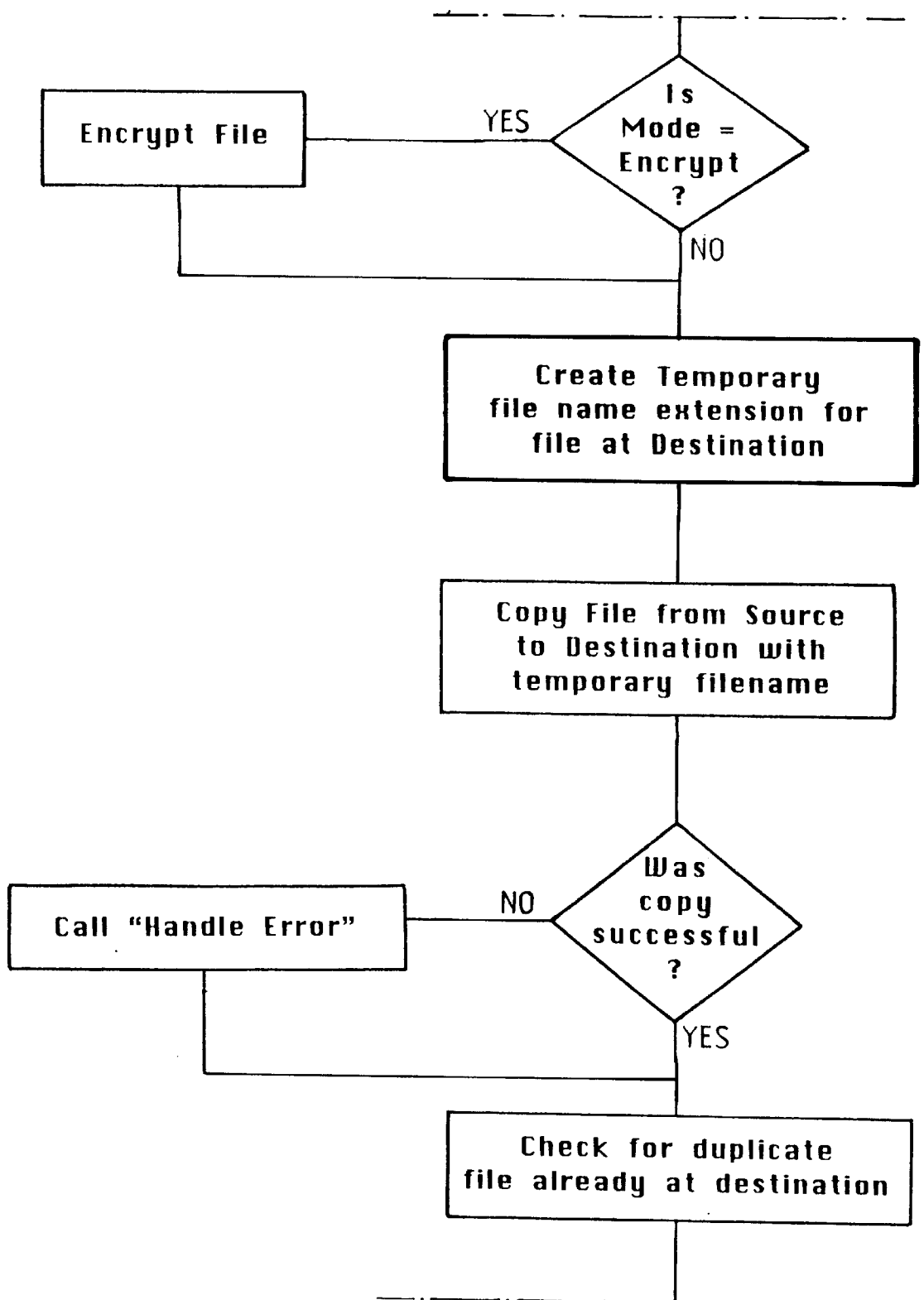
FIG. 9 is a block circuit schematic diagram of a personality module interconnected with a programming adaptor and FIG. 10 is an assembly diagram showing the configuration of a personality module.
Figure 9C:
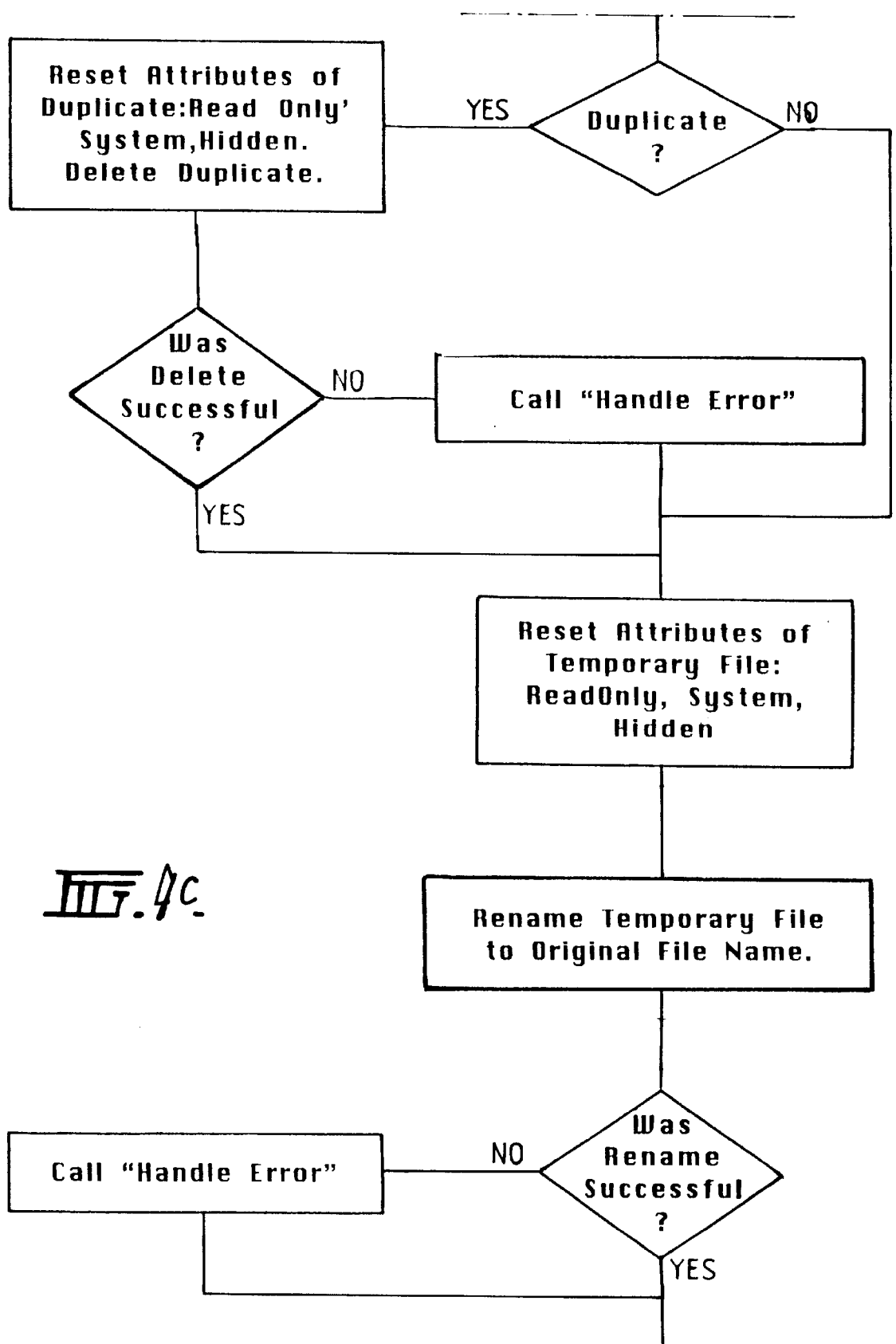
Figure 9D:
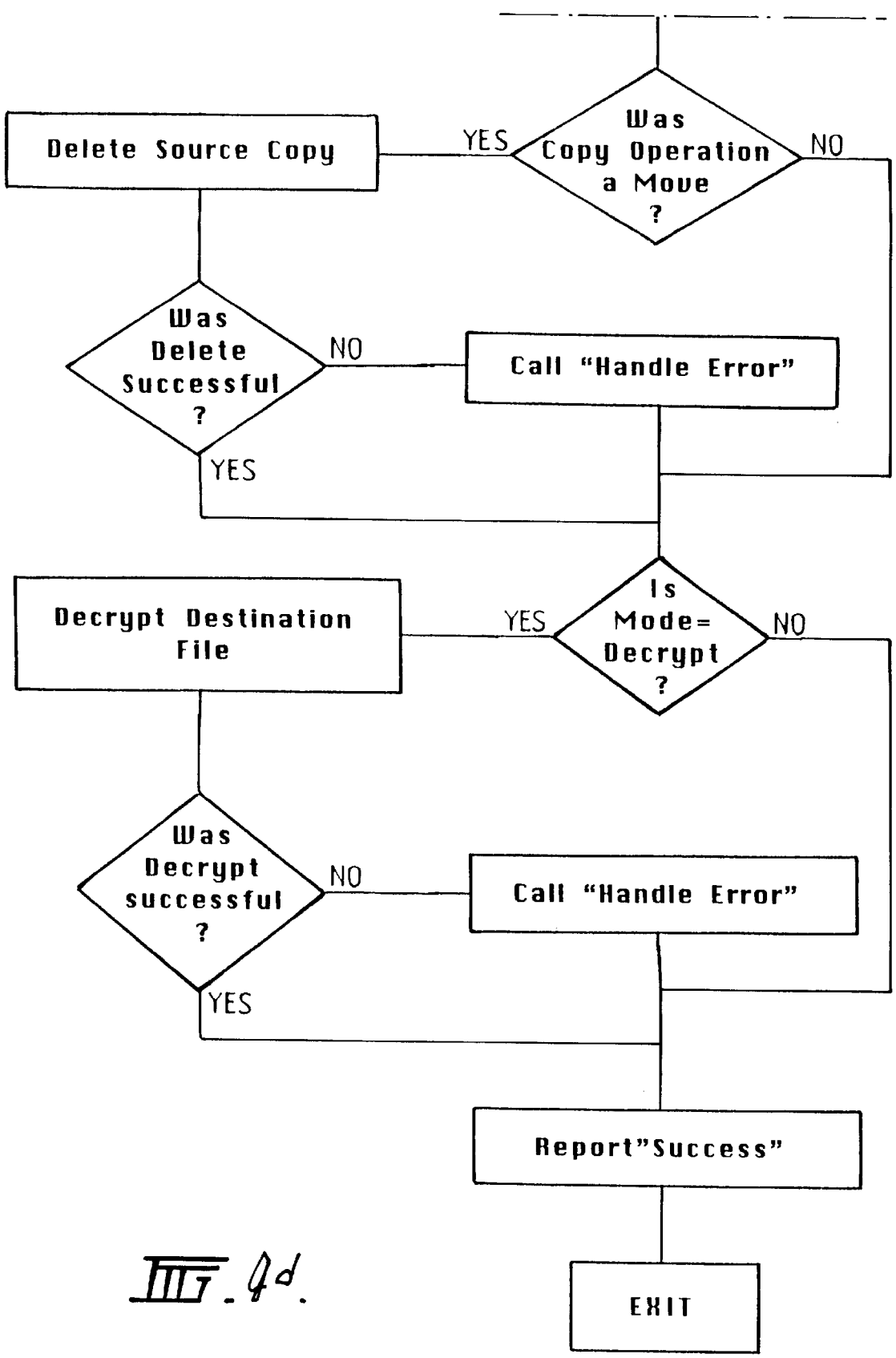

The operation of these routines and sub-modules is shown in FIGS. 4a and 4b.

File Propagation Operation

The process begins by polling to try and establish a Windows Socket connection to a known TCP/IP (Transport Control Protocol/Internet Protocol) address. This is, in fact, to the Echo Service, a simple service that echoes back what is sent to it. If the process succeeds in establishing this socket connection via the LAN, then it signifies that the LAN is indeed present and operating. If the attempt fails due to "blocking" or in other words, the function cannot reach the Echo Service and is waiting for it to respond, then it is assumed that the LAN is not connected. The attempt is cancelled and retried again 5 seconds later. This process has been chosen because it is the fastest way to establish LAN presence without holding up other parts of the program.

If the connection is established, the mobile computer 13 is then connected to the Airport Computer Server 3 drive array as a local drive via the LAN, subject to login, password and permission's. It is then able to perform any drive operations that it wishes on the drive in the mobile computer 13.

It firstly looks for a file called "Ident.txt" on the remote drive, which it loads and examines to find out which airport it is connected to.

The cabin crew are able, via the touchscreen control panel of the mobile computer 13, to enter reports of aircraft faults or irregularities and an Aircraft Fault Report File is then created. IF a fault is recorded it is then copied to the airport. The airport computer server 3, recognising the presence of this file, will then arrange to FAX the contents of the file to the relevant maintenance department via the modem 27.

It is also necessary to keep track of the number of times certain movies are played, as these are payable to film distributors on a per-screening basis. Once a month, the program content provider places a file on the local airport computer server 3 called "MovieLogRequest.txt". This file contains one single character of no importance. What is important is the creation date of this file.

The mobile computer 13 checks for presence of the "MovieLogRequest.txt" file at the airport and compares the date against the copy it has on-board. If the airport copy is newer, it copies it on-board and then places a copy of its movie screening log onto the airport computer server 3, recognising the presence of this file, will then arrange to FAX the contents of the file to the program content provider. Each file is uniquely identified by the aircraft's registration number so that the movie screenings can be allocated against individual aircraft and perhaps, routes.

After these preliminary housekeeping duties are complete, the main process of file propagation begins. The aim in this process is to examine the creation date of a range of file types and either take on-board newer files from the Airport Computer Server 3 or alternatively place its own newer files on the airport computer server 3. The culmination of this process is that an aircraft moving from one port to another will therefore automatically propagate the newer files around the network, thus the new files only need to be introduced at one port and will then be carried to all ports in the network.

At the same time, if an operator decides that a file is damaged for any reason a decision can be made to delete that file and a fresh copy will then be automatically picked up at the next airport.

This copying process is carried out for Data Files, Audio/Video and Audio Only Program Files, and Program Executables, and can also handle other file types such as games according to future requirements.

One exception to this process is that way that video/audio MPEG files are handled, and this is to do with the way the program schedule identifies these programs. The schedule specifies the items to play as a SITCOM, MOVIE, PROMO (Promotional advertisement) COMM (Commercial) SHORT (Short Subject) etc. and furthermore adds a number from 01 to 99. Thus a schedule may look like this:
NEWS
SITCOM01
PROMO02
COMM12
MOVIE04

But at any time it does not necessarily know the actual name of the item specified. In this way, a schedule may stay un-altered for a long period of time while the actual programs are changing. This is handled by the filename structure. For example, the fourth movie may have a filename like:

MOVIE04 The West Wind 134.mpg.

This name identifies it as Movie number 4, for the benefit of the schedule. The movie title "The West Wind" is able to be extracted to advise the cabin crew, and the length in minutes, or 134 minutes, is also able to be extracted to assist in calculating the total program running time. The mpg extension identifies this as an MPEG file.

When the movie "The West Wind" has finished its run on the aircraft, a new movie will replace it with a filename also starting with MOVIE04, although the rest of the filename will be totally different. The File Propagation Software will, as part of the normal process, bring this file on-board simply because it is a newer file. It must then identify this as MOVIE04 and erase the older file also identified as MOVIE04, and do the same for all other types, SITCOM. PROMO. COMM etc. The primary purpose of this scheme is to ensure that there is always a MOVIE04 on-board that can be played, until replaced by newer one.

Once the copying process is complete, it then loads the "ClearFile.txt" file from the Airport Computer Server 3 and deletes any files specified by this file, if it has them. It then examines its own local storage array and deletes any leftover temporary files, as defined by a "$$$"file name suffix.

As a last action, it then looks to see if it has a copy of "Error.log" on-board, and moves this to the Airport Computer Server 3 giving it a unique filename that includes the aircraft registration number. This is performed last of all in case an entry needs to be logged by the preceding processes.

Now that all file movement is complete, the mobile computer 13 disconnects the Airport Computer Server 3 drive array from itself, notifies the LAN Connection Security Device that transfers are complete, and places a message to this effect on the cabin crew's screen to say that the cable may be removed.

If during the copy process, a fresh copy of the News is taken on board the system looks at the date of this copy and checks if it is more than 3 days old. This aging value can be set to any number desired. If older than 3 days or so, it warns the crew that it may be out-of-date.

Finally, if new program executables have been taken on board, it shuts down the system and re-boots. The Startup File Verification Module will then fail, copy the new executables from the Backup directory into the main directory and computer 13 will re-launch.

Thus it can be seen that when data is transferred that it transferred to unoccupied file area in storage memory, and that after transfer, software is invoked to determine if all data to be transferred has been transferred and only then does it cause that transferred data to be useable in lieu of any older data which may be in the storage memory. It can also be seen that the data is checked to determine that all data intended to be transferred has been transferred and then the system deletes any data that it is intended to replace. This occurs because it may be that an aircraft may leave an airport terminal prior to completion of data transfer. In that way the old files would be corrupted if they were merely replaced by the new data. It can also be seen that the transferred data be given the same file name or a same part file name as the data which has been deleted.

Figure 5B:
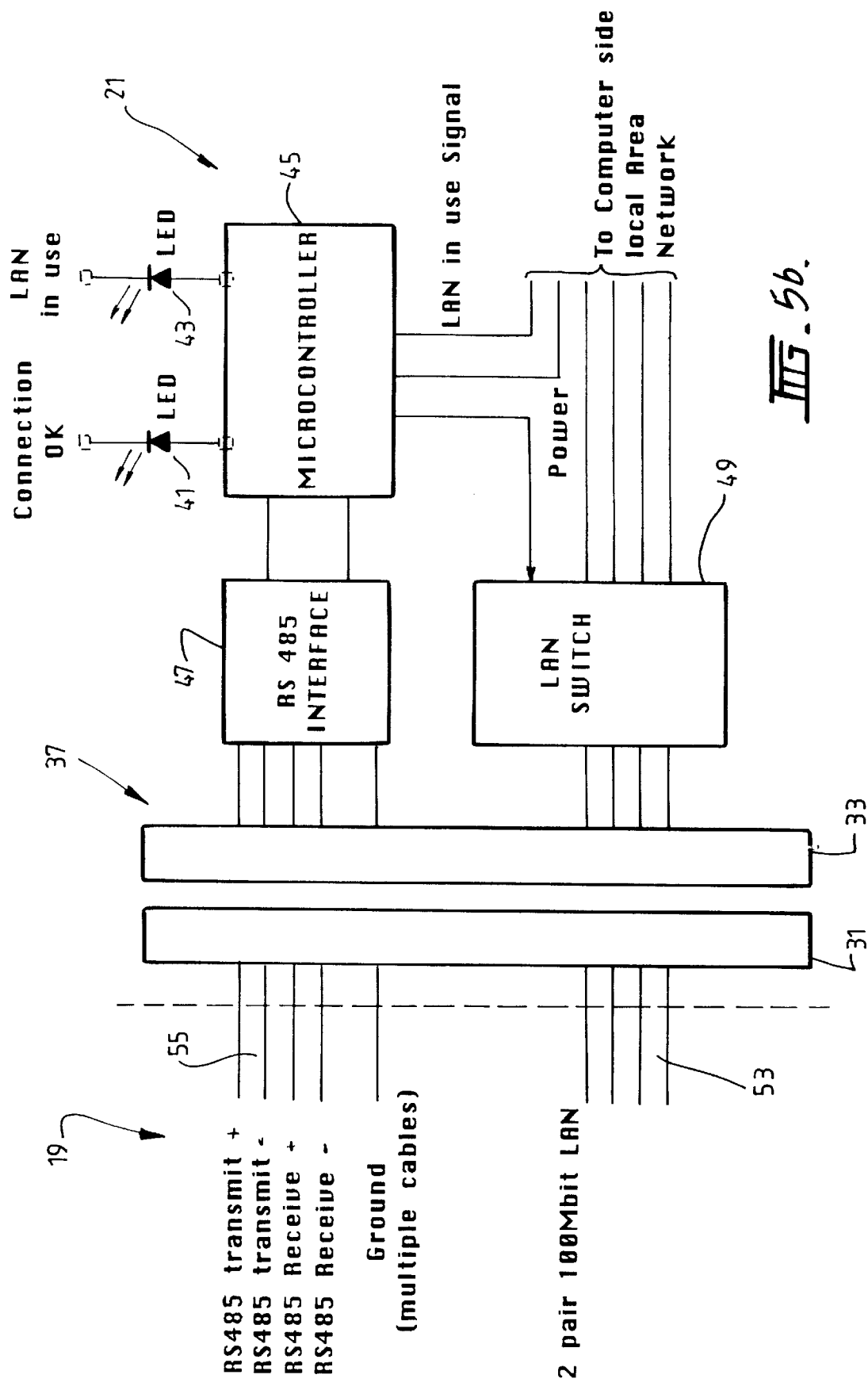
Figures 6, 7:
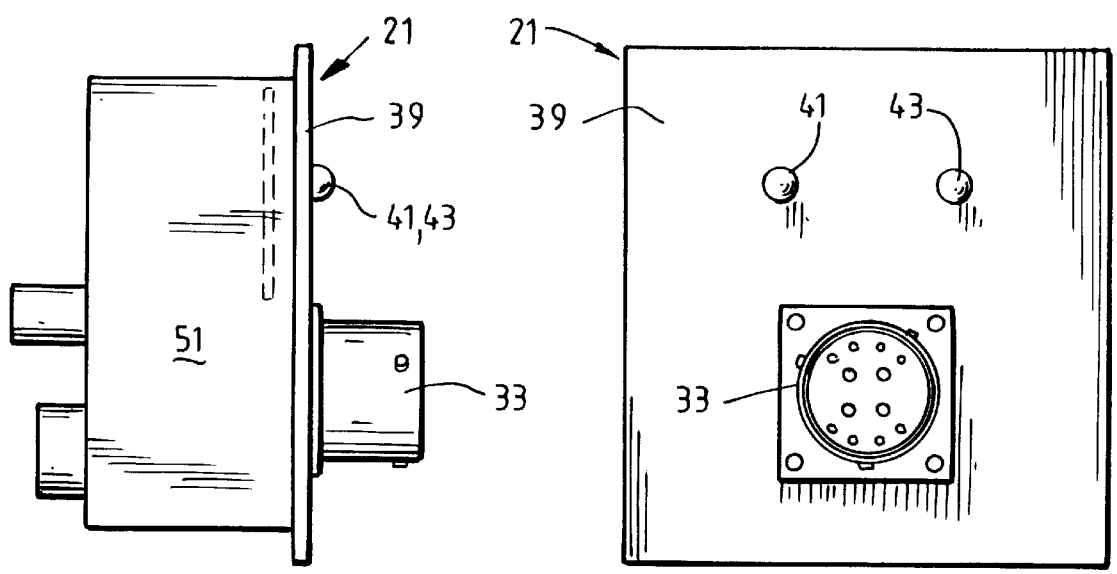
FIG. 6 is a side view of a panel layout of a connector for use with the circuit of FIG. 5.
FIG. 7 is a front elevation of the panel of the connector of FIG. 6.

Referring now to FIGS. 5, 6 and 7 there is shown the LAN connection security devices 21 and their arrangement in the system.

Here, the cable interconnect 19 (see FIG. 5) has twelve conductors and is wired in non-standard configuration thereby introducing possible confusion to any attempted access. It can be seen that the interconnect cable 19 has respective connectors 31 at each end. These connectors mate with corresponding connectors 33 provided respectively on an airport side 35 and on an aeroplane side 37. Typically, the connectors 31 and 33 are military style connectors. The cable 19 has a tough outer jacket to withstand abuse in a high traffic area at the end of the aerobridge 9. FIGS. 6 and 7 show the arrangements for the connectors 33 both in the aircraft, and at the airport terminal. The connectors 33 are mounted on a panel 39 together with two LED's 41 and 43. The LAN connection security device 21 contains a mircocontroller chip 45, an RS485 serial interface chip 47, and a LAN switch chip 49 all contained in a strong tamper proof housing 51. Typically, the connector 33 can have the pins rotated off the standard engagement alignment so that only a specifically ordered connector can be mated therewith. This is provided to make unauthorised connection difficult. The device 21 at the aerobridge 9 is powered from a local power supply 53. The device 21 in the aircraft is powered from the mobile computer 13 itself. Whilst both LAN connection security devices 21 are physically identical, a strap option on the printed circuit board of each can be used to configure one unit to be an Initiator and the other as a Respondent. The device 21 at the aircraft is always an Initiator, and the device at the aerobridge 9 is always a Respondent. The Initiator will always be attempting to establish a connection and the Respondent would always be attempting to receive a request from an Initiator to assure itself that connection should be made or remain. The Respondent simply answers the Initiator and responds to commands from it.

When the two LAN connection security devices 21 are connected together by means of the interconnect cable 19 the two microcontrollers 45 at each end converse serially with each other via the four wire RS485 connection and negotiate a password exchange. This exchange is carried out in a lengthy, repetitive and intentionally confusing manner to frustrate the coding.

If the password exchange is successful, the controllers enable their LAN switches at each end and turn on a LED 41 to signify "Connection OK". The LAN switches simply pass the 4 wire LAN connection through and make it available at the connector on the face on the panel 39. If the password exchange is not successful in its entirety, the LAN switches remain open and the LAN connection is not available at the connector.

During the connection, the Initiator looks at the state of the RS485 connection to see if it has been broken, and at the same time enquires if the Respondent is still connected. The Respondent must reply to this enquiry within a known period otherwise the Initiator will sever the connection. The Respondent must receive an enquiry within the same period, otherwise it can also sever the connection.

Once a successful connection is made and the LAN switches are closed, the mobile computer 13 can then connect to the local Airport Computer Server 3. The mobile computer 13 is polling for the existence of a device at a known TCP/IP address, every 5 seconds. If the LAN connection is intact and the Airport Computer Server 3 responds, the mobile computer 3 may then connect the Airport Computer Server 3 drive array to itself and begin file transfers. If the mobile computer 13 decides that file transfers are necessary, it sends a command to the Initiator device 19 at its end via the "LAN In Use" signal cable. The Initiator then turns on the second LED 43 to signify "LAN In Use", and commands the Respondent to do the same at the other end.

Once the mobile computer 13 has finished file transfers, it shuts down the "LAN" In Use" signal, the Initiator switches off the LED 43 and commands the Respondent to do the same at the other end. This is the signal for the aerobridge operator that file transfers are complete and that the cable 19 between the two devices 21 can be disconnected. Of course, it may be that the aircraft has to depart before the file transfer is complete, and this is permissible. The aerobridge operator may disconnect the cable 19 at any time, and the two devices 19 will sense the disconnection, open their LAN switches and turn off the LED's 43 and 41. The computer 13 will also detect the loss of the LAN connection through a provision in the File Propagation Software and invoke a program to use the old data.

Thus, the data which is to pass occurs by operation of switches within each of the devices 19. These switches in turn, interconnect the data exchange lines 53. Thus, it can be seen that a pass-through command is provided upon the checking and this, in turn, enables the data to transfer through the data exchange lines 53. It can also be seen that the pass-through commands are provided on the lines 55. It can also be seen that the Initiator is configured to check if the Respondent is still connected during the passing of the data and it is configured to terminate the passing of the data if the Respondent is not connected. It should also be seen that the Respondent is configured to check if the Initiator is still connected during the passing of data and to terminate the passing of data if the Initiator is not connected. It can also be seen that the computer 3 which is connected within the LAN is configured as a Respondent, and that the mobile computer 13 is configured as an Initiator. It can also be seen that one of the computers 13, 3 is configured to periodically poll its respective device 21 and if the device 21 is in a pass-through mode to only then initiate a procedure to allow data transfer. It can also be seen that the polling occurs not only prior to data transfer but also during data transfer. It can also be seen that if the device 21 is not in pass-through mode that the passing of the data is terminated.

Figure 10:
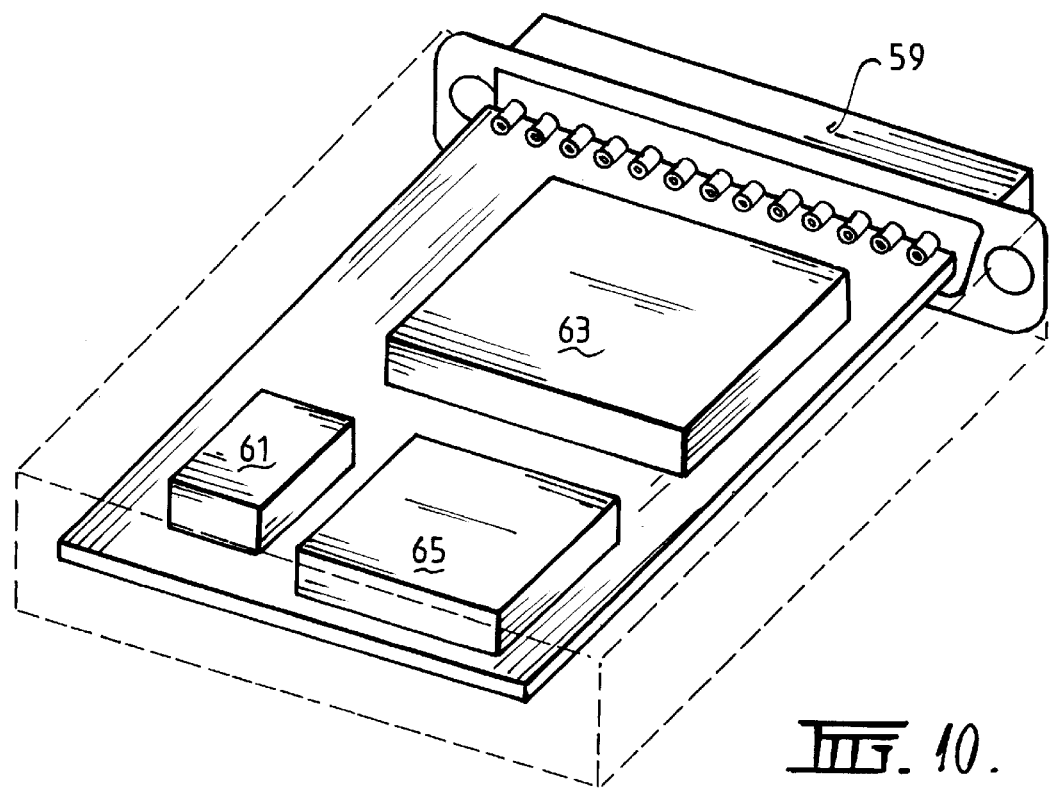

Each of the mobile computers 13 in the system can be identical. Because an airline has many different aircraft, each mobile computer 13 needs to be configured for the particular aircraft in which it is installed. This is achieved by use of a "personality module" which is described in FIGS. 8, 9 and 10. It should be appreciated that the computer 13 will be used in an aircraft to receive certain signals from the aircraft and, in turn, control some aircraft functions. The computer 13 has 16 inputs and 16 outputs to work with and these can be assigned to the airlines maintenance requirements in any order and for any supported function. Thus, this can represent a particular environment for a given aircraft and so that its external outputs and external inputs can be suitably configured.

A personality module 57 is provided as a small module which is fractionally larger than the size of a typical computer connection device. In this particular example the connector device 59 is a male DB25 connector plug. This is arranged to plug into a corresponding female connector socket on the mobile computer 13. The personality module 57 has a memory device 61 in the form of a flash memory 61. Information can be stored within the flash memory 61 concerning the particular aircraft. Typically, the module 57 can have the aircraft's type and registration number attached to a front visible surface by way of a printed sticker. The module 19 can be made captive to the aircraft by a small metal cable so that it remains with the aircraft when the computer is removed, and so it is then available to connect to a replacement computer 13. The personality module 57 also contains a microprocessor 63, an RS232 serial interface 65 and a parallel interface 67. Parallel port interface 67 has not been shown in FIG. 10 as it forms part of the microcontroller 63 itself. The whole board and its components are encapsulated in epoxy resin to protect it generally and also to prevent tampering. The flash memory 61 has 16 K-bytes of non-volatile Flash memory which can not be overwritten unless external pins 69 and 71 are linked. It can be seen that the 8 byte parallel port 67 has TTL level connections that can be configured as either input or outputs. Thus, the Flash memory 61 can be addressed either to read the contents or to write contents therein. FIG. 8 shows a connection with a mobile computer 13 at an aircraft and shows connection with the computer sub-system in the mobile computer 13. It also shows connection with the power supply 75 of the mobile computer 13.

Figure 9:
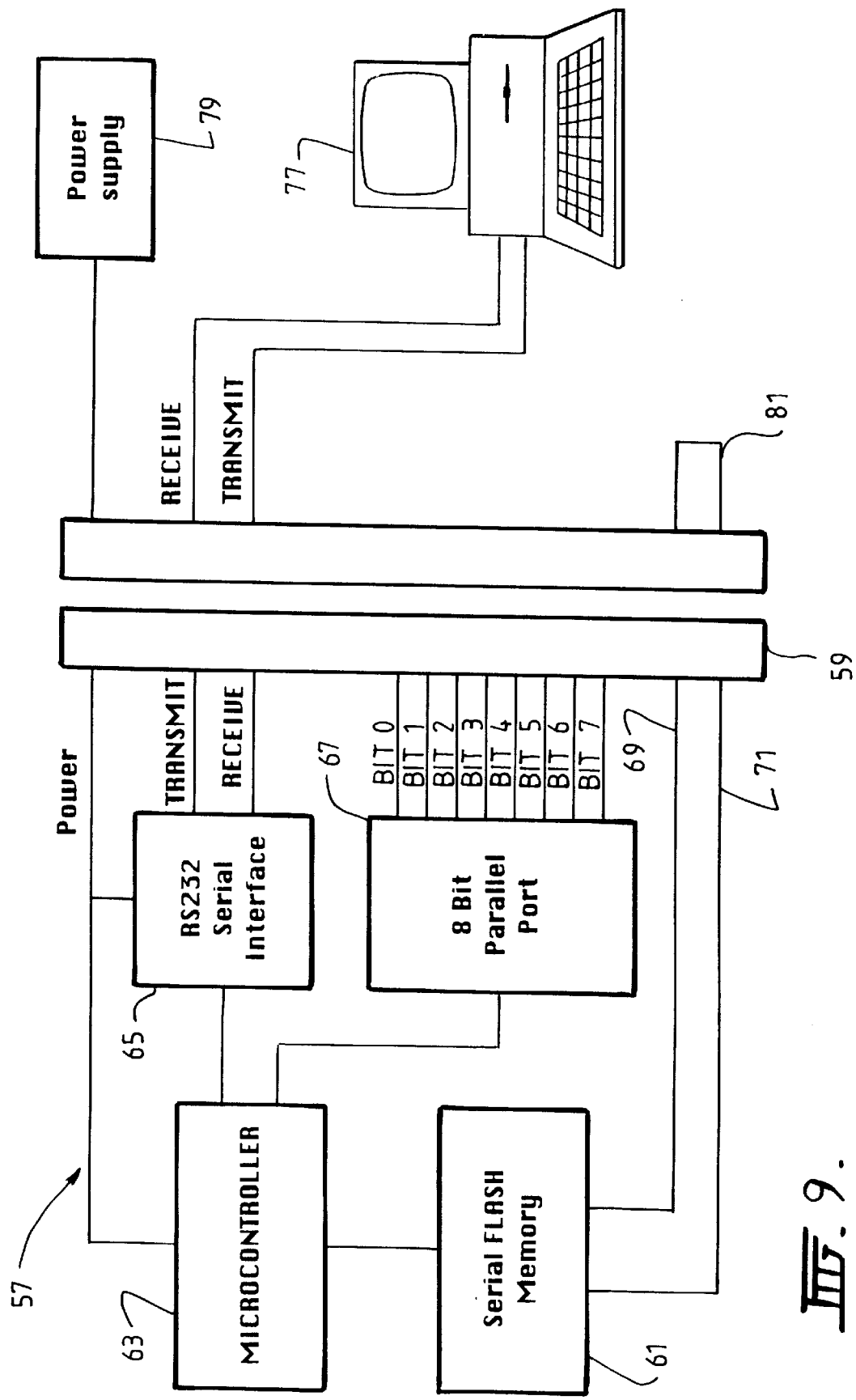

FIG. 9 shows a connection to a programming adaptor such as an aircraft supervisory station or some other station where the personality module is to be programmed. Here it can be seen that there is interconnection to a personal computer 77 and to a local power supply 79 which may, in fact, be the power supply of the personal computer 77.

FIG. 9 also shows a shorting link 81 used to bridge the pins 69 and 71 of the flash memory 61 to permit writing into memory. Thus, the computer 77 can contain software with appropriate information to program the personality module 57.

At start-up of the computer 13 operating system, the personality data is read from the personality module 57 and is used to configure the mobile computer 13 so that its external input and output connections correspond with those of the particular aircraft.

If the module is not plugged in at start-up, then the program within the mobile computer 13 will not begin but will enter an error mode and inform cabin staff that the system cannot be operated until the module is connecting and operating.

It should therefore be seen that the personality module 57 is for use with a computer device to instruct that device as to the personality of the environment in which the device is to operate. In this way the external inputs and outputs of the computer device can be configured to that environment. The module has a connector for mating with a corresponding connector connected with the mobile computer 13 and the module also has a memory device 61 which has pre-stored personality information therein. At start-up of the computer device, a routine is followed which interrogates the personality module 57 and then configures the computer device for that environment according to the personality information in the memory 61. The arrangement is such that identical computer devices can be provided in many different environments and can be swapped from one environment to the other and be configured for the new environment by the personality module for that new environment. It can also be seen that the module 15 can be physically attached to the aircraft and therefor forms part of the environment.

It can also be seen that the microcontroller 63 connected with the memory 61 has a serial port interface 65 and a parallel port interface 67. The microcontroller 63 is provided with software which is responsive to input from the computer device via the serial port interface 65 to provide access via said parallel port interface 67 to the contents within the flash memory 61. It can also be seen that the flash memory 61 has write protection means in the form of pins 69 and 71 which can be defeated via the shorting link 81 when the personality module 57 is connected with a memory programming device such as personal computer 77. It can also be seen that the write protection is invoked when the personality module is connected with the mobile computer 13 as no shorting link 81 is provided in that configuration.

Modifications may be made to the present invention as would be apparent to persons skilled in the art of producing computer systems including computer systems for aircraft use.

Modifications may also be made by persons skilled in the art of providing equipment for aircraft.

These and other modifications may be made without departing from the ambit of the invention the nature of which is to be determined from the aforegoing description.

What is claimed is:

1. A method of propagating data throughout a computer system having mobile computers, and a respective computer server device at each of a plurality of fixed sites, said method comprising providing relevant data at said computer server device to be transferred to said mobile computers, making a data exchange connection between a mobile computer and said computer server device when a mobile computer visits said site, providing authorisation checking when said data exchange connection is made to determine if said mobile computer is an authorised computer, conducting software checking to determine if relevant data resident in said computer server device is more recent than the relevant data in said mobile computer, invoking further software to transfer the relevant data from said computer server device to said computer if it is more recent than the relevant data in said mobile computer, and if the relevant data in said mobile computer is more recent than the relevant data in said computer server device, invoking said further software to transfer the relevant data from said mobile computer to said computer server device, so that the more recent of said relevant data is resident in both said mobile computer and said computer server device and repeating the process with further mobile computers when they visit said site whereby said relevant data can be propagated, and wherein when relevant data is required to be propagated it is only introduced to a computer server device at one of said fixed sites, and that it is propagated to a further one of said plurality of fixed sites by being transferred to a mobile computer visiting said one site and then to said further one of said plurality of sites when said mobile computer visits said further one of said plurality of sites, thereby providing said further one of said plurality of sites with the relevant data for propagation to further mobile computers which visit said further one of said plurality of sites.

2. A method as claimed in claim 1 wherein said authorisation, said determining, and said data transfer are provided automatically upon making said data exchange connection.

3. A method as claimed in claim 2 wherein said system is an airline system having airport terminals each with a respective computer server device, and wherein aircraft of said airline each have a respective computer fitted therein so as each aircraft makes a journey the computers therein are rendered mobile, and those computers are said mobile computers in said system.

4. A method as claimed in claim 1 wherein at least one of the computer server devices is connected to receive relevant data from an external source to said system.

5. A method as claimed in claim 4 wherein said external source is a media production house which has a data exchange link with said computer server device.

6. A method as claimed in claim 3 wherein said relevant data is data for use in providing entertainment and/or information to passengers of the aircraft.

7. A method as claimed in claim 3 wherein each airport terminal has a LAN and that each aircraft boarding area at said airport have a respective computer server connector connected to said LAN, and wherein when data is transferred to said computer server, it is made available at all other computer server connectors in said LAN which are for connecting with mobile computers.

8. A method as claimed in claim 1 wherein when data is transferred it is transferred to unoccupied file area in storage memory, and that after transfer, software is invoked to determine if all data to be transferred has been transferred and only then causing that transferred data to be useable in lieu of any older data which may be in the storage memory.

9. A method as claimed in claim 8 wherein the transferred data is checked to determine that all data intended to be transferred has been transferred and then the data it is intended to replace is deleted.

10. A method as claimed in claim 9 wherein the transferred data is given the same file name or a same part file name as any data deleted.

11. A method as claimed in claim 3 wherein said computer server and the storage medium at the computer server are stored in a secure area at an airport.

12. A method of propagating data throughout a computer system having mobile computers, and a respective computer server device at each of a plurality of fixed sites, said method comprising providing relevant data at said computer server device to be transferred to said mobile computers, making a data exchange connection between a mobile computer and said computer server device when a mobile computer visits said site, providing devices on each side of the connection dedicated to security checking and operating independently of said computers, said devices communicating via a communication line separate to said data exchange line, one of the devices being an Initiator for initiating a security checking request, and the other of the devices being a Respondent for receiving a security checking request from an Initiator, and for providing a pass-through command on said communication line in response to such request, and only in response to said pass-through command allowing data to pass between the two computers via said data exchange line, conducting software checking to determine if relevant data resident in said computer server device is more recent than the relevant data in said mobile computer, invoking further software to transfer the relevant data from said computer server device to said computer if it is more recent than the relevant data in said mobile computer, and if the relevant data in said mobile computer is more recent than the relevant data in said computer server device, invoking said further software to transfer the relevant data from said mobile computer to said computer server device, so that the more recent of said relevant data is resident in both said mobile computer and said computer server device and repeating the process with further mobile computers when they visit said site whereby said relevant data can be propagated, and wherein when relevant data is required to be propagated it is only introduced to a computer server device at one of said fixed sites, and that it is propagated to a further one of said plurality of fixed sites by being transferred to a mobile computer visiting said one site and then to said further one of said plurality of sites when said mobile computer visits said further one of said plurality of sites, thereby providing said further one of said plurality of sites with the relevant data for propagation to further mobile computers which visit said further one of said plurality of sites.

13. A method as claimed in claim 12 wherein said system is an airline system having airport terminals each with a respective computer server device, and wherein aircraft of said airline each have a respective computer fitted therein so as each aircraft makes a journey the computers therein are rendered mobile and those computers are said mobile computers in said system.

14. A method as claimed in claim 12 wherein at least one of the computer server devices is connected to receive relevant data from an external source to said system.

15. A method as claimed in claim 14 wherein said external source is a media production house which has a data exchange link with said computer server device.

16. A method as claimed in claim 13 wherein said relevant data is data for use in providing entertainment and/or information to passengers of the aircraft.

17. A method as claimed in claim 13 wherein each airport terminal has LAN and that each aircraft boarding area at said airport have a respective computer server connector connected in said LAN, and wherein when data is transferred to said computer server, it is made available at all other computer server connectors in said LAN which are for connecting with mobile computers.

18. A method as claimed in claim 12 wherein when data is transferred it is transferred to unoccupied file area in storage memory, and that after transfer, software is invoked to determine if all data to be transferred has been transferred and only then causing that transferred data to be useable in lieu of any older data which may be in the storage memory.

19. A method as claimed in claim 18 wherein the transferred data is checked to determine that all data intended to be transferred has been transferred and then the data it is intended to replace is deleted.

20. A method as claimed in claim 19 wherein that the transferred data is given the same file name or a same part file name as any data deleted.

21. A method as claimed in claim 13 wherein said computer server and the storage medium at the computer server are stored in a secure area at an airport.

22. A method as claimed in claim 12 wherein data is allowed to pass by operation of switches within each of said devices which to complete said data exchange line at each computer.

23. A method as claimed in claim 12 wherein a password exchange is performed between said two devices during said security checking request.

24. A method as claimed in claim 12 wherein the Initiator checks if the Respondent is still connected during the passing of data and terminates the passing of data if the Respondent is not connected.

25. A method as claimed in claim 12 wherein the Respondent checks if the Initiator is still connected during the passing of data and terminates the passing of data if the Initiator is not connected.

26. A method as claimed in claim 12 wherein one of the computers is in a LAN and that the device connected with that computer is configured and operate as a Respondent, and the other computer is a mobile computer and the device connected with that computer is configured as an Initiator and operated as an Initiator.

27. A method as claimed in claim 12 wherein said one of the computers is configured to periodically poll the device connected therewith and if the device is in a pass-through mode to only then initiate a procedure to allow data transfer.

28. A method as claimed in claim 27 wherein said polling is performed not only prior to data transfer but also during data transfer, and if said device is not in a pass-through mode terminating the passing of data.

29. A computer system having mobile computers, and a respective computer server at each of a plurality of fixed sites, said system being for propagating data between said mobile computers and said computer server or vice versa, said computer server and said mobile computers each having a data exchange connection means to allow data exchange therebetween, and also resident software to automatically determine if a mobile computer in data exchange connection with said computer server is an authorized computer, and to determine if a version of data in said mobile computer is more recent than a version in said computer server, and for transferring the version in said computer server, and for transferring the version of said data from said mobile computer to said server if it is more recent than the version in said computer server, and for transferring the version of said data in said computer server to said mobile computer if it is more recent than the version in said mobile computer, and wherein when relevant data is required to be propagated it is first introduced to a computer server at one of those fixed sites, and then to other computer servers at other fixed sites by being transferred to a mobile computer visiting said one of those fixed sites, and to a computer server at another of those fixed sites when said mobile computer visits a further one of said fixed sites, thereby providing said further one of said fixed sites with data for propagation to further mobile computers which visit said further one of said sites.

30. A system as claimed in claim 29 being an airline system having airport terminals each with a respective computer server device, and wherein aircraft of said airline each have a respective computer fitted therein so as each aircraft makes a journey the computers therein are mobile.

31. A system as claimed in claim 29 wherein at least one of the computer server devices is connected to receive relevant data from an external source to said system.

32. A system as claimed in claim 31 wherein said external source is a media production house which has a data exchange link with said computer server device.

33. A system as claimed in claim 29 wherein said data is data for use in providing entertainment and/or information to passengers of the aircraft.

34. A system as claimed in claim 29 wherein each airport terminal has a LAN and that each aircraft boarding area at said airport have a respective computer server connector connected in said LAN, and wherein when data is transferred to said computer server, it is made available at all other computer server connectors in said LAN which are for connecting with mobile computers.

35. A system as claimed in claim 29 wherein said computer server and the storage medium at the computer server are stored in a server area at an airport.

36. A computer system having mobile computers, and a respective computer server at each of a plurality of fixed sites, said system being for propagating data between said mobile computers and said computer server or vice versa, said computer server and said mobile computers each having a data exchange connection means to allow data exchange therebetween, and also resident software to automatically determine if a mobile computer in data exchange connection with said computer server is an authorised computer, and to determine if a version of data in said mobile computer is more recent than a version in said computer server, and for transferring the version of said data from said mobile computer to said server if it is more recent than the version in said computer server, and for transferring the version of said data in said computer server to said mobile computer if it is more recent than the version in said mobile computer so that the more recent version of said data is stored in both said mobile computer and said computer server, there being devices on each side of the connection dedicated to security checking and operating independently of said computers, said devices communicating via a communication line separate to said data exchange line, one of the devices being an Initiator for initiating a security checking request, and the other of the devices being a Respondent for receiving a security checking request from an Initiator, and for providing a pass-through command on said communication line in response to such request, and only in response to said pass-through command allowing data to pass between the two computers via said data exchange line, said Respondent continually checking for the receipt of a security checking request from an Initiator regardless of whether an Initiator is connected thereto, said Initiator and said Respondent repeating the security checking throughout the passing of data between the two computers, and wherein when relevant data is required to be propagated it is only introduced to a computer server at one of those fixed sites, and then to other computer servers at other fixed sites by being transferred to a mobile computer visiting said one of those fixed sites, and to computer servers at another of those fixed sites when said mobile computer visits a further one of said fixed sites, thereby providing said further one of said fixed sites with data for propagation to further mobile computers which visit said further one of said sites.

37. A system as claimed in claim 36 being an airline system having airport terminals each with a respective computer server device, and wherein aircraft of said airline each have a respective computer fitted therein so as each aircraft makes a journey the computers therein are mobile.

38. A system as claimed in claim 36 wherein at least one of the computer server devices is connected to receive relevant data from an external source to said system.

39. A system as claimed in claim 36 wherein said external source is a media production house which has a data exchange link with said computer server device.

40. A system as claimed in claim 36 wherein said data is data for use in providing entertainment and/or information to passengers of the aircraft.

* * * * *